US011133870B2

(12) United States Patent
Sengupta

(10) Patent No.: US 11,133,870 B2
(45) Date of Patent: Sep. 28, 2021

(54) FIBER OPTIC CONNECTORS AND CONNECTORIZED FIBER OPTIC CABLES THAT INCLUDE INTEGRATED PHOTONIC OPTICAL MODE FIELD CONVERTERS AND RELATED METHODS

(71) Applicant: CommScope, Inc. of North Carolina, Hickory, NC (US)

(72) Inventor: Abhijit Sengupta, Alpharetta, GA (US)

(73) Assignee: CommScope, Inc. of North Carolina, Hickory, NC (US)

(*) Notice: Subject to any disclaimer, the term of this patent is extended or adjusted under 35 U.S.C. 154(b) by 1277 days.

(21) Appl. No.: 14/324,269

(22) Filed: Jul. 7, 2014

(65) Prior Publication Data

US 2015/0050019 A1 Feb. 19, 2015

Related U.S. Application Data

(60) Provisional application No. 61/865,246, filed on Aug. 13, 2013.

(51) Int. Cl.
*G02B 6/14* (2006.01)
*G02B 6/38* (2006.01)
(Continued)

(52) U.S. Cl.
CPC ....... *H04B 10/2581* (2013.01); *G02B 6/3845* (2013.01); *G02B 6/4214* (2013.01); *H04J 14/04* (2013.01); *G02B 6/14* (2013.01); *G02B 6/3652* (2013.01); *G02B 6/3809* (2013.01); *G02B 6/3853* (2013.01); *G02B 2006/1213* (2013.01)

(58) Field of Classification Search
CPC .... G02B 6/322; G02B 6/3652; G02B 6/4214; G02B 6/3845; G02B 6/3853; G02B 6/14; G02B 6/3809; G02B 2006/1213; H04B 10/2581
See application file for complete search history.

(56) References Cited

U.S. PATENT DOCUMENTS 5,479,540 A * 12/1995 Boudreau ............ G02B 6/4246
 385/14
5,999,672 A * 12/1999 Hunter ............... G02B 6/29307
 385/24

(Continued)

FOREIGN PATENT DOCUMENTS

| CN | 1853085 A | 10/2006 |
|---|---|---|
| CN | 101533128 A | 9/2009 |
| CN | 102119350 A | 7/2011 |

OTHER PUBLICATIONS

Notification of Transmittal of the International Search Report and Written Opinion Corresponding to International Application No. PCT/US2014/046463; dated Oct. 27, 2014; 13 Pages.

(Continued)

*Primary Examiner* — Ryan A Lepisto
*Assistant Examiner* — Erin D Chiem
(74) *Attorney, Agent, or Firm* — Merchant & Gould P.C.

(57) ABSTRACT

Fiber optic connectors are provided that include a substrate having a groove therein, an optical fiber that is at least partly in the groove, an optical mode field converter or other focusing reflector that is positioned to receive an optical signal that is output from the optical fiber and a housing that surrounds the substrate and the optical fiber.

22 Claims, 14 Drawing Sheets

(51) Int. Cl.
*G02B 6/42* (2006.01)
*G02B 6/36* (2006.01)
*G02B 6/12* (2006.01)
*H04B 10/2581* (2013.01)
*H04J 14/04* (2006.01)

(56) References Cited

U.S. PATENT DOCUMENTS

| | | | |
|---|---|---|---|
| 6,002,818 A | 12/1999 | Fatehi et al. | |
| 6,238,100 B1 | 5/2001 | Sasaki et al. | |
| 6,832,031 B2 * | 12/2004 | Smaglinski | G02B 6/262 385/15 |
| 7,292,749 B2 * | 11/2007 | Gluckstad | G02B 6/02347 385/27 |
| 7,366,366 B2 | 4/2008 | Takei et al. | |
| 9,057,841 B2 | 6/2015 | Ji et al. | |
| 2002/0012498 A1 | 1/2002 | Danziger | |
| 2002/0085801 A1 | 7/2002 | Mettler et al. | |
| 2002/0085805 A1 | 7/2002 | Mettler et al. | |
| 2003/0128916 A1 | 7/2003 | Sasaki | |
| 2006/0210222 A1 * | 9/2006 | Watte | G02B 6/32 385/39 |
| 2008/0019642 A1 * | 1/2008 | Kewitsch | G02B 6/3825 385/72 |
| 2013/0236193 A1 | 9/2013 | Sengupta | |
| 2014/0193116 A1 * | 7/2014 | Bylander | G02B 6/4214 385/33 |
| 2014/0270652 A1 * | 9/2014 | Barwicz | G02B 6/3636 385/83 |

OTHER PUBLICATIONS

Greiner, C., et al., "Spectral Engineering of Wavelength-Division Multiplexers Based on Planar Holographic Bragg Reflectors," Optical Fiber Communication Conference, Los Angeles, IEEE, Feb. 23-24, 2004, vol. 1, pp. TU13 1-3.
International Preliminary Report on Patentability Corresponding to International Application No. PCT/US2014/046463; dated Feb. 25, 2016; 10 Pages.
Chinese Office Action for Application No. 201480045169.7 dated Jan. 4, 2017 (with English Translation).
Chinese Office Action for Application No. 201910109923.3 dated Apr. 21, 2020 (with English Translation).
Pending Claims for Chinese Application No. 201910109923.3.

* cited by examiner

FIBER OPTIC CONNECTORS AND CONNECTORIZED FIBER OPTIC CABLES THAT INCLUDE INTEGRATED PHOTONIC OPTICAL MODE FIELD CONVERTERS AND RELATED METHODS

CROSS-REFERENCE TO RELATED APPLICATION

The present application claims priority under 35 U.S.C. § 119 to U.S. Provisional Patent Application Ser. No. 61/865,246, filed Aug. 13, 2013, the entire contents of which is incorporated herein in its entirety.

BACKGROUND

The present disclosure relates generally to fiber optic communications systems and, more particularly, to fiber optic connectors that include optical mode field converters and to connectorized fiber optic cables that include such fiber optic connectors.

When an optical signal is transmitted over an optical fiber, the optical fiber may support one or a plurality of propagation modes, depending upon, for example, the wavelength of the optical signal and the size (e.g., diameter) of the core of the optical fiber. Generally speaking, if the wavelength of the optical signal is fixed, the number of propagation modes that the optical fiber supports increases with increases in the size of the core of the optical fiber. An optical fiber that supports a single propagation mode for an optical signal having a specified wavelength is referred to as a "single-mode optical fiber." An optical fiber that supports no more than a small number of propagation modes (e.g., 2-5) for an optical signal at a specified wavelength is often referred to as a "few-mode optical fiber," For purposes of this application, the term "few-mode optical fiber" refers to an optical fiber that supports five or fewer propagation modes for a specified wavelength, and specifically encompasses single-mode optical fibers. Similarly, the term "multi-mode optical fiber" refers to an optical fiber that supports more than five propagation modes for a specified wavelength. Multi-mode optical fibers often support tens or hundreds of propagation modes. The number of propagation modes that are supported by a particular optical fiber depends on the wavelength of the optical signal that is transmitted over the optical fiber, and thus an optical fiber may operate as a single-mode optical fiber for a first range of wavelengths, as a few-mode optical fiber for a second range of wavelengths, and as a multi-mode optical fiber for a third range of wavelengths.

A parameter known as the "cut-off wavelength" specifies the wavelength for a particular optical fiber at which the fiber will change from operating as a single-mode optical fiber to a few-mode optical fiber that supports at least two propagation modes. Since optical fibers are typically designed to carry optical signals at a particular wavelength, optical fibers are often referred to generically as "multi-mode optical fibers" or as "single-mode optical fibers" without reference to a particular optical signal wavelength, as the wavelength is implied by the intended use of the optical fiber. By way of example, the optical transmitter(s) that are attached to an optical fiber will typically be designed to transmit optical signals at a single wavelength or over a narrow wavelength range, and hence these optical transmitter(s) define the wavelength that allows one to determine the number of propagation modes that are supported by the optical fiber.

Vertical-cavity surface-emitting lasers ("VCSELs") are a type of laser that may be used to generate and transmit optical signals over optical fibers. VCSELs that are widely used for transmitting optical signals over multi-mode optical fibers are typically referred to as "multi-mode VCSELs." Multi-mode VCSELs can be coupled directly to a multi-mode optical fiber without the need for alignment optics. Because alignment optics are not required, multi-mode VCSELs can support high data rate optical communications for short range applications, such as many enterprise applications, at a relatively low cost. While single-mode optical fibers are less expensive than multi-mode optical fibers, coupling losses and/or the cost of alignment optics generally make it disadvantageous to use single-mode optical fibers for many short range applications.

Multi-mode VCSELs are typically designed to transmit optical signals at wavelengths of about 850 nm, which is the wavelength that is typically used for multi-mode optical communications. Multi-mode VCSELs and multi-mode optical fibers are typically used for short distance communications (e.g., 600 meters or less) in "enterprise" applications such as communications within office buildings or within a campus, because of the cost advantages associated with the use of multi-mode VCSELs and because the large core diameter of multi-mode optical fibers simplifies connections. Typically, these VCSEL-driven multi-mode optical links are used to transmit signals at data rates of 10 Gigabits/second ("Gbps") or higher.

An important characteristic of an optical fiber is the distance over which the fiber can support a given data rate level or bandwidth. Unfortunately, multi-mode optical signals suffer from a spreading of the optical pulse which is referred to as "modal dispersion" or differential mode delay ("DMD") that result from the propagation of many different modes through the optical fiber. As modal dispersion builds up very quickly in multi-mode optical fibers (e.g., within a few hundred meters), it effectively limits the use of multi-mode optical transmissions to relatively short distances (e.g., to distances of 600 meters or less for typical optical data rate requirements). Accordingly, single mode optical fibers are typically used for longer distance communications, and are typically transmitted at around 1310 nm or around 1550 nm. However, single mode optical fibers may require the use of more expensive transceivers, alignment optics and other equipment. The current industry trend is to support increasing data rate (bandwidth) demands by reducing the lengths of the multi-mode optical fiber links in order to avoid the increased costs associated with the use of single mode optical fibers. However, in larger enterprise installations such as campuses, data centers, large office buildings and the like, these restrictions on the lengths of the optical fiber links may make it more difficult and/or expensive to use multi-mode optical fibers in some situations, or even preclude the use of such multi-mode optical fiber links.

SUMMARY

Pursuant to embodiments of the present invention, fiber optic connectors are provided that include a substrate that has a groove. An optical fiber is at least partly positioned in the groove. An optical mode field converter is positioned to receive an optical signal that is output from the optical fiber. A housing surrounds the substrate and the optical fiber.

In some embodiments, the optical mode field converter may also be positioned at least partially within the groove in the substrate. In some embodiments, at least a portion of the groove may have a generally U-shaped cross-section, a generally V-shaped cross-section or a generally semi-circular cross-section. The optical mode field converter may be configured to expand a first light field output by the optical fiber into a second, larger area light field, and may be configured to compress a third light field received at a light field input/output port of the fiber optic connector into a fourth, smaller area light field that is input to the optical fiber.

In some embodiments, the optical mode field converter may be a concave mirror or a Holographic Bragg Grating reflector. The groove may extend beyond an end of the optical fiber, and may include a reflective sidewall that is configured to receive light output from the optical fiber or light reflected by the optical mode field converter. The optical fiber may be an optical fiber pigtail. The fiber optic connector may be provided in combination with a fiber optic cable that includes a second optical fiber, at least one strength member and a jacket. In such embodiments, the optical fiber pigtail may be fused to the second optical fiber and the fiber optic connector may be mounted on or partially within the fiber optic cable to provide a connectorized fiber optic cable. In other embodiments, the optical fiber may be an optical fiber of a fiber optic cable that further includes at least one strength member and a jacket to provide a connectorized fiber optic cable.

In some embodiments, the substrate may have a front edge, a rear edge and a pair of side edges, and a first end of the groove may be at the rear edge of the substrate and a second end of the groove may be at one of the side edges of the substrate. In other embodiments, the first end of the groove may be at the rear edge of the substrate and the second end of the groove may also at the rear edge of the substrate. The groove may include at least one curved or angled section. A portion of the optical fiber that is within the groove may define a first longitudinal axis, and a light input/output port of the fiber optic connector may be offset from the first longitudinal axis.

Pursuant to further embodiments of the present invention, fiber optic connections are provided that include a first fiber optic connector that has a first housing, a first optical fiber that extends from a rear surface of the first housing, and a first light input/output port within a side surface of the first housing. These fiber optic connections further include a second fiber optic connector that has a second housing, a second optical fiber that extends from a rear surface of the second housing, and a second light input/output port within a side surface of the second housing. The first and second fiber optic connectors are mounted in a side-by-side fashion and the first and second light input/output ports are in optical communication with each other.

In some embodiments, the first optical fiber and the second optical fiber may be positioned side-by-side. The first optical fiber may be within a first groove in a first substrate that is mounted in the first housing, and the second optical fiber may be within a second groove in a second substrate that is mounted in the second housing. A first optical mode field converter may be positioned to receive an optical signal that is output from the first optical fiber and a second optical mode field converter may be positioned to receive the optical signal and inject it into the second optical fiber. The first and second optical fibers may be few-mode optical fibers for the optical signal, and wherein the optical signal passes as a multi-mode optical signal between the first and second optical mode field converters. The first optical mode field converter may be within the first groove and the second optical mode field converter may be within the second groove. The first substrate may include silicon, and the first optical mode field converter may be formed at least partly in a sidewall of the first groove.

Pursuant to still further embodiments of the present invention, fiber optic multiplexer/de-multiplexers are provided that include a single core optical fiber; a Holographic Bragg Grating reflector that is positioned to directly or indirectly receive an output of the single core optical fiber; and a plurality of optical fiber transmission mediums that are positioned to directly or indirectly receive a plurality of signals output by the Holographic Bragg Grating reflector.

In some embodiments, the plurality of optical fiber transmission mediums may comprise a plurality of cores of a multi-core optical fiber or may comprise a plurality of additional single core optical fibers. The plurality of optical fiber transmission mediums may each receive a respective one of a plurality of optical signals that are wave division multiplexed onto the single core optical fiber.

DETAILED DESCRIPTION

Figure 1A:
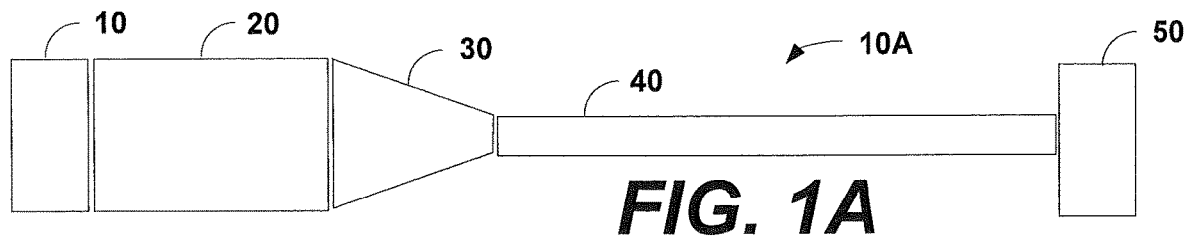
FIGS. 1A-1G are schematic block diagrams of optical communications systems that may use the fiber optic connectors and/or connectorized fiber optic cables according to embodiments of the present invention.

U.S. patent application Ser. No. 13/594,908, filed Aug. 27, 2012 ("the '908 application"), the entire content of which is incorporated herein by reference as if set forth fully herein, discloses optical communications systems that use optical mode field converters to compress a relatively large area light field that is received from, for example, a multi-mode VCSEL or a multi-mode optical fiber into a much smaller area light field which may be optically coupled onto a small core optical fiber such as a single mode optical fiber or onto a small optical waveguide. The optical mode field converters disclosed in the above-referenced '908 application use, for example, small form factor, low cost, photonic-based optical mode field converters which may be fabricated from silicon-based substrates (e.g., silicon, silicon nitride, silica, etc.) or substrates made of other materials (e.g., germanium) using semiconductor, micro electro-mechanical ("MEMS") and/or micro-machining fabrication and processing techniques. Herein the term "photonic optical mode field converter" is used to refer to an optical mode field converter that is formed from a wafer or other substrate using semiconductor processing, MEMS and/or micro-machining fabrication and/or processing techniques. A large number of photonic optical mode field converters may be formed on a single substrate at a foundry, and the substrate may then by diced to provide a large number of singulated photonic optical mode field converters. The '908 application discloses a variety of ways to implement photonic optical mode field converters.

Pursuant to embodiments of the present invention, fiber optic connectors are provided that include integrated photonic (or non-photonic) optical mode field converters, as are connectorized fiber optic cables that include such fiber optic connectors. The fiber optic connectors according to embodiments of the present invention may be fabricated on a wafer (except for the housings thereof), may not have moving parts, and may not require the use of ferrules, bonding processes, alignment steps and/or fiber polishing as is typically required with conventional fiber optic connectors. As such, these fiber optic connectors can have a significantly simpler assembly process, which can dramatically reduce the cost of fabricating the fiber optic connectors and connectorized fiber optic cables. Moreover, the connectorized fiber optic cables and fiber optic connectors according to embodiments of the present invention may use mode field conversion to convert, near the point of connection, a small area light field into a large area light field and then re-convert the large area light field back into a small area light field at the other side of the connection. This allows the connection between two fiber optic transmission paths to be in the form of a large area light field that is less sensitive to alignment errors, dust specks and other factors that may increase the coupling loss of a fiber optic connection, while still allowing transmission of an optical signal as, for example a single-mode optical signal over most of the optical transmission path. Moreover, following the techniques disclosed in the above-referenced '908 application, the connectorized fiber optic cables according to some embodiments of the present invention may use inexpensive multi-mode VCSELs to transmit optical signals over single-mode optical fibers, allowing for higher data rates and/or longer transmission paths. In other embodiments of the present invention, single mode optical sources such as optical transceivers that include lasers that are coupled to distributed feedback gratings that inject an optical signal that has a single propagation mode (or a few modes) onto a single mode optical fiber may be used, and fiber optic cables that have connectors that are implemented using integrated photonic optical mode field converters may be used along the optical communications path to provide connections that are less sensitive to alignment errors, dust specks and the like.

According to embodiments of the present invention, fiber optic connectors are provided that include an integrated photonic optical mode field converter that is formed on a substrate such as, for example, a silicon substrate, a silica substrate, a silicon nitride substrate, etc. Substrates that include silicon may be used in some embodiments because such substrates can be etched, patterned and/or formed with very high levels of precision using, for example, photolithography, etching and/or thin film deposition techniques that have been developed for the semiconductor industry. The substrate includes at least one groove that receives an optical fiber. The photonic optical mode field converter may be formed at least partly in the groove. The substrate may be mounted in a housing, and the housing may hold the optical fiber within the groove. In some embodiments, the photonic optical mode field converter may be fabricated within the groove using photolithography, etching and/or thin film deposition techniques. An end of the optical fiber may extend outside the housing. In some embodiments, the optical fiber may comprise an optical fiber pigtail that may, for example, be fused to an optical fiber of a fiber optic cable using heat fusing or a laser splice. In other embodiments, the optical fiber may comprise an optical fiber of a fiber optic cable (i.e., the fiber optic cable is connectorized at the factory to provide a connectorized fiber optic cable).

In some embodiments, the photonic optical mode field converter may be used to compress an 850 nm optical signal having a light field with a diameter of on the order of, for example, about 50 microns that is received from a multi-mode optical fiber (or other multi-mode optical source) to an 850 nm optical signal having a light field with a diameter on the order of, for example, about 5 microns, which signal may be optically coupled onto a single-mode optical fiber. Photonic optical-mode field converters may also be provided that expand an 850 nm optical signal having a light field with a diameter on the order of, for example, about 5 microns into an 850 nm optical signal having a light field with a diameter of on the order of, for example, about 50 microns.

In other embodiments, the photonic optical mode field converters may be used to expand/compress other wavelength optical signals such as, for example, single mode optical signals having a wavelength of about 1310 nm or about 1550 nm. In such embodiments, the photonic optical mode field converters may be used to expand the light field of the optical signals at connection points where, for example, two fiber optical cables are connected to each other and/or or at patch panels and other connections points.

It will be appreciated that the above-referenced embodiments are simply examples of implementations of fiber optic connectors that include photonic optical mode converters according to embodiments of the present invention, and that many other applications are possible, including the numerous applications disclosed in the above-referenced '908 application.

The fiber optic connectors according to embodiments of the present invention may replace conventional fiber optic connectors that include polished ferrules. Conventional fiber optic connectors typically require manual precision assembly that includes steps such as bonding steps, alignment steps and polishing steps that require high precision and which may be very expensive and time-consuming to perform. These conventional connectors also include moving parts (e.g., ferrules). In contrast, fiber optic connectors according to embodiments of the present invention may be mass-produced in a foundry setting, may eliminate some or all of the bonding, alignment and polishing steps, and may have no moving parts, which may result in more reliable and robust connectors.

A variety of methods are known for reducing the area of a light field of an optical signal that is output from a first element so that the optical signal may be optically coupled onto a second element that has a smaller cross-sectional area. For example, a large area light field may be passed through a lens that focuses the large area light field that is output from the first element into a small area light field that may be input to the second element. As another example, a large area light field that is output by the first element may be passed through a tapered waveguide that reduces the large area light field to a smaller area light field that may be input to the second element. Unfortunately, these known approaches may require highly accurate alignment of the first and second elements, and often exhibit high signal coupling losses. Because of these difficulties, single-mode optical fiber communications systems typically use much more highly focused lasers than the multi-mode VCSEL lasers that are used in multi-mode optical fiber communications, and may also use a lens to further focus the optical signal to facilitate coupling the optical signal directly from the optical transmitter (i.e., the laser) onto the single-mode optical fiber.

The above-referenced '908 application discloses optical communications systems which employ photonic optical mode field converters to compress a relatively large area light field that is received from, for example, a multi-mode optical fiber or a multi-mode VCSEL that transmit signals in, for example, the 830 nm to 1360 nm range into a much smaller area light field which may be coupled onto, for example, a few-mode optical fiber or to a small area, high-speed photodetector.

By way of example, FIGS. 1A-1E are schematic block diagrams of various optical communications systems that are disclosed in the above-referenced '908 application. The fiber optic connectors and connectorized cables according to embodiments of the present invention may be used in implementing these optical communications systems.

In particular, FIG. 1A illustrates an optical communications system 10A that includes an optical light source 10, a multi-mode optical fiber 20, an optical mode field converter 30, a few-mode optical fiber 40 and a small light field optical receiver 50 (e.g., an optical receiver with a photodetection area that is slightly larger than the cross-sectional area of a single-mode optical fiber). The optical light source 10 may be, for example a semiconductor laser or light emitting diode. In some embodiments, the optical light source 10 may be an optical transmitter that includes a multi-mode VCSEL that transmits optical signals at certain wavelengths that are within the range of 830 nm to 1360 nm that has a relatively large area light field such as, for example, a light field having a diameter of between about 25 microns and about 65 microns.

The optical light source 10 may couple the large area light field optical signal onto a first end of the multi-mode optical fiber 20. The multi-mode optical fiber 20 may comprise, for example, a conventional optical fiber that is designed for 850 nm optical signals that has a core diameter of between about 25 microns and about 65 microns. The multi-mode optical fiber 20 may be enclosed within an optical cable structure that includes strength members, buffer tubes, a cable jacket and/or other conventional fiber optic cable components. The second end of the multi-mode optical fiber 20 may be coupled to the optical mode field converter 30.

The optical mode field converter 30 may comprise, for example, any of the optical mode field converters that are disclosed in the '908 application. The optical mode field converter 30 may receive the large area light field output by the multi-mode optical fiber 20, and may then reduce this large area light field to a substantially smaller area light field (e.g., ten to one hundred times smaller), and then couples the small area light field onto the few-mode optical fiber 40. The few-mode optical fiber 40 may comprise, for example, a conventional single mode optical fiber that is designed for 1310 nm optical signals that has a core diameter of, for example, about 5 microns. The few-mode optical fiber 40 may be enclosed within an optical cable structure that may include strength members, buffer tubes, a cable jacket and/or other conventional optical cable components. The optical fiber 40 may support a small number of modes (e.g., 1-4 modes) when an 850 nm optical signal is launched into the optical fiber 40. The few-mode optical fiber 40 may couple the optical signal that is received from the optical mode field converter 30 to the small light field optical receiver 50. The small light field optical receiver 50 may comprise, for example, any conventional optical receiver (or transceiver) that is capable of converting an optical signal to an electrical signal. The optical receiver 50 may have a small area photodetector that is, for example, approximately matched in size to the cross-sectional area of the few-mode optical fiber 40. The use of such a small area photodetector may allow for faster photodetection.

Figure 1B:
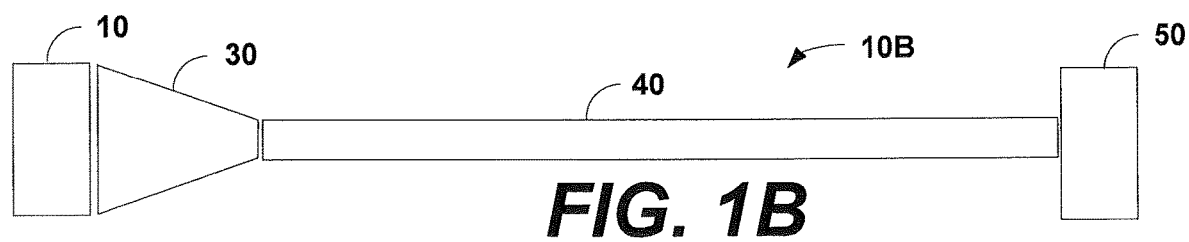

FIG. 1B is a schematic block diagram of an optical communications system 10B that is identical to the optical communications system 10A described above, except that the multi-mode optical fiber 20 of optical communications system 10A has been omitted. The optical communications system 10B provides a mechanism for directly coupling an optical signal from multi-mode VCSEL onto a single-mode optical fiber via the optical mode field converter 30.

Figure 1C:
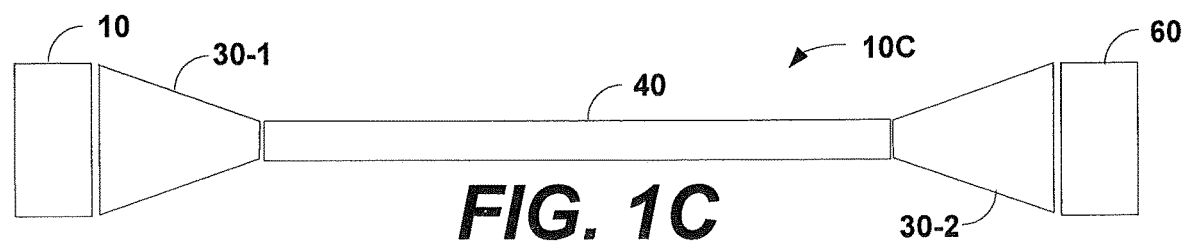

FIG. 1C is a schematic block diagram of another optical communications system 10C. The optical communications system 10C is identical to the optical communications system 10B described above, except that (1) the optical communications system 10C includes a second optical mode field converter 30-2 (the first optical mode field converter 30 is labeled 30-1 in FIG. 1C in order to differentiate between the first and second optical mode field converters) and (2) the small light field optical receiver 50 included in the optical communications system 10B is replaced with a large light field optical receiver 60. The large light field optical receiver 60 may comprise, for example, an optical receiver (or transceiver) that is designed to receive 850 nm multi-mode optical signals from a multi-mode optical fiber. The second optical mode field converter 30-2 that is included in the optical communications system 10C may be used to convert the small area light field that is output by the few-mode optical fiber 40 into a large area light field that is passed to a photodetector in the large light field optical receiver 60. The optical communications system 10C may be implemented, for example, in an already-installed multi-mode optical communications system by simply replacing an existing multi-mode optical fiber with the few-mode optical fiber 40 and the two optical mode field converters 30-1, 30-2.

Figure 1D:
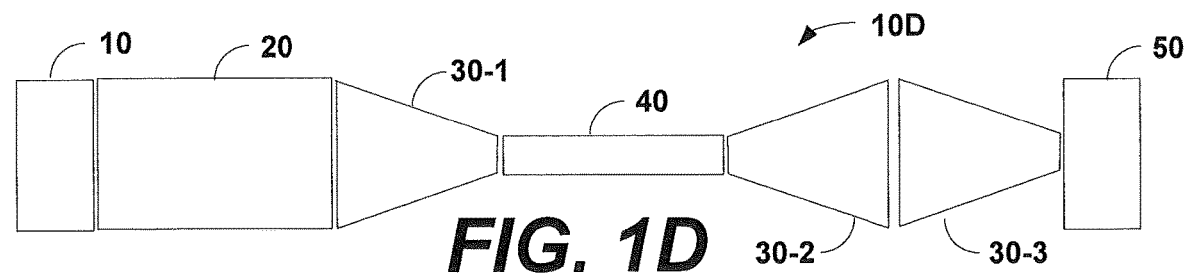

FIG. 1D is a schematic block diagram of an optical communications system 10D that is identical to the optical communications 10A described above, except that the optical communications system 10D includes two additional optical mode field converters 30-2, 30-3. The provision of the second and third optical mode field converters 30-2, 30-3 allows a technician to only expose components having large area light fields when making connectivity changes.

Figure 1E:
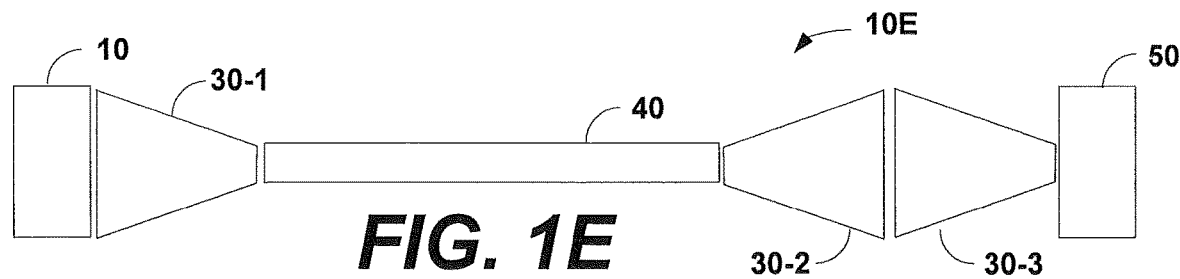

FIG. 1E is a schematic block diagram of an optical communications system 10E that is identical to the optical communications system 10D described above, except that the multi-mode optical fiber 20 of optical communications system 10D has been omitted so that the optical light source 10 is coupled directly to the optical mode field converter 30-1. The optical communications system 10E provides a mechanism for directly using multi-mode VCSELs for communications over single-mode optical fibers.

As noted above, the fiber optic connectors and cables according to embodiments of the present invention may be used in, for example, applications that employ single mode optical transceivers as well as in applications that employ multimode optical transceivers such as VCSELs. By way of example, FIGS. 1F-1G are schematic block diagrams of two additional example optical communications systems which use fiber optic cables according to embodiments of the present invention.

Figure 1F:
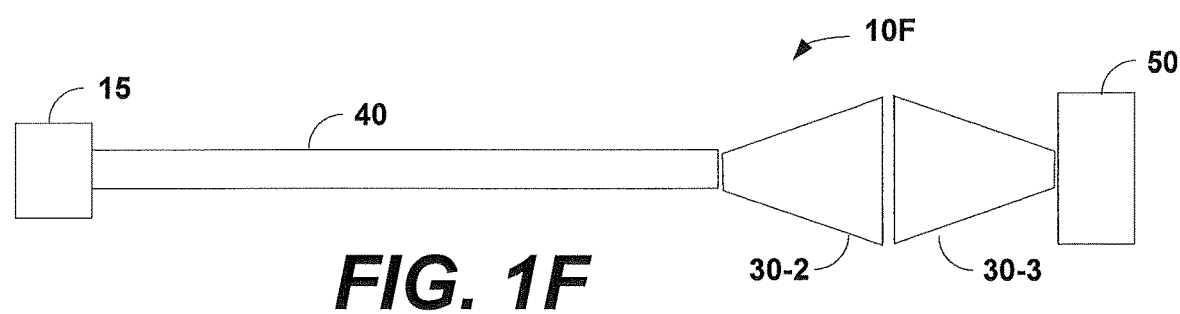

In the embodiment of FIG. 1F, the optical communications system 10F includes an optical light source 15, that may be, for example, an optical transmitter that outputs a very narrow beam optical signal such as a distributed feedback grating laser. The optical source 15 may output an optical signal at, for example, about 1310 nm or at about 1550 nm. The optical communications system 10F further includes a few-mode optical fiber 40, an optical mode field converter 30-2, an optical mode field converter 30-3, and a small light field optical receiver 50. The optical mode field converters 30-2, 30-3 may be used to provide a large area light field at the connection point between fiber optic cable 40 and optical receiver 50.

Figure 1G:
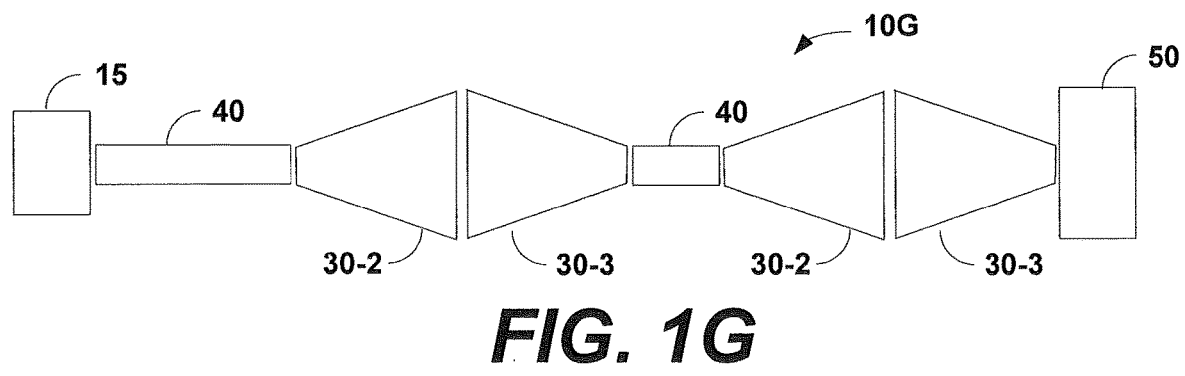

FIG. 1G is a schematic block diagram of an optical communications system 10G that is similar to the optical communications system 10F described above, except that the optical communications system 10G further includes an additional few-mode optical fiber 40 and an additional set of optical mode field converters 30-2, 30-3. As shown in FIG. 1G, the additional set of optical mode field converters 30-2, 30-3 may used to provide a large area light field at the connection point between the two few mode optical fibers 40.

Pursuant to embodiments of the present invention, fiber optic connectors are provided that may be used to implement the connectorized multi-mode fiber optic cables, connectorized single-mode fiber optic cables and connectorized multi-mode to single-mode fiber optic cables. These connectorized fiber optic cables may be used, for example, to implement the optical communications systems of FIGS. 1A-1G above. For example, a connectorized fiber optic cable may be provided that includes the few-mode optical fiber 40 and fiber optic connectors on one or both ends of the cable that include the optical mode field converters 30-1, 30-2. The components of the fiber optic connectors according to embodiments of the present invention may be mass produced at low cost, and the connectorized cables that use these fiber optic connectors may cost significantly less to assemble than conventional connectorized fiber optic cables. The fiber optic connectors that are used in the connectorized fiber optic cables according to some embodiments of the present invention may terminate an optical fiber directly onto a substrate that includes a photonic optical mode field converter. Semiconductor and/or MEMS processing and fabrication techniques may be used to etch a groove into the substrate that receives the optical fiber, and/or to form an optical mode field converter in or on the substrate that receives a light field that is output by the optical fiber. The substrate and the end portion of the optical fiber may be enclosed in a housing to form the fiber optic connector. The fiber optic connector may include features that facilitate mating with another fiber optic connector.

Exemplary embodiments of the present invention will now be discussed in greater detail with reference to FIGS. 2-19.

Figure 2:
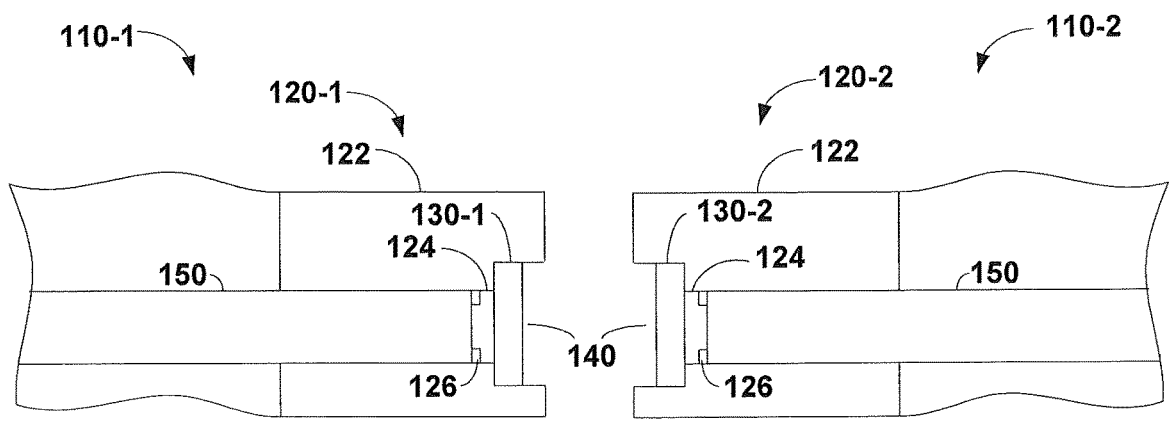
FIG. 2 is a schematic plan view of end portions of a pair of connectorized fiber optic cables according to certain embodiments of the present invention where each fiber optic connector includes an optical mode field converter.

FIG. 2 is a schematic plan view of end portions of first and second connectorized fiber optic cables according to certain embodiments of the present invention. The depicted fiber optic connectors of these connectorized fiber optic cables each include a photonic optical mode field converter.

As shown in FIG. 2, first and second connectorized fiber optic cables 110-1, 110-2 are provided. Herein, when multiple of the same components are described and illustrated they may be referred to individually by their full reference numeral (e.g., connectorized fiber optic cable 110-2) and they may be referred to collectively by the first part of their reference numeral (e.g., the connectorized fiber optic cables 110). A respective fiber optic connector 120-1, 120-2 is mounted on an end of each connectorized cable 110-1, 110-2. The fiber optic connectors 120-1, 120-2 may be mated directly to each other to allow an optical signal to pass from the first connectorized fiber optic cable 110-1 to the second connectorized fiber optic cable 110-2. Alternatively, the fiber optic connectors 120-1 and 120-2 may each be mated to an adapter structure (not shown) to allow an optical signal to pass from the first connectorized fiber optic cable 110-1 to the second connectorized fiber optic cable 110-2.

Typically, each connectorized fiber optic cable 110 will include a fiber optic connector 120 on each end of the cable (although only one end of each connectorized fiber optic cable 110 is depicted in FIG. 2 to simplify the drawing). In some embodiments, the two fiber optic connectors 120 of each connectorized fiber optic cable 110 may be identical, although they need not be. Each connector 120 may include a substrate 122. In example embodiments, the substrate 122 may comprise a semiconductor substrate such as a silicon substrate or a substrate formed from a silicon containing material such as silica, silicon nitride or the like. However, it will be appreciated that the substrate 122 may be formed of any suitable material that may be processed using, for example, semiconductor processing techniques, MEMS processing techniques and/or micro-machining fabrication techniques. The substrate 122 may comprise a "chip" that is diced from a larger wafer. For example, in some embodiments, a silicon wafer may be grown and processed to form a plurality of the substrates 122. In some embodiments, hundreds or thousands of substrates 122 may be prepared from a single wafer. Once the processing is completed, the wafer may be cut along scribe lines or "diced" to singulate the wafer into the plurality of substrates 122.

As shown in FIG. 2, each substrate 122 may include a groove 124. The groove 124 may comprise, for example, a semicircular groove, a U-shaped groove, a V-shaped groove 124 or the like. An end of an optical fiber 150-1 or 150-2 may be positioned within the groove 124. The groove may be very precisely positioned on the substrate using, for example, semiconductor photolithography and etching techniques that are used to fabricate highly integrated semiconductor devices such as semiconductor memory devices. The optical fiber 150 may, in some embodiments, be interference fit within the groove 124. The groove 124 may include one or more stops or other fiber alignment structures 126 that facilitate positioning the end of the optical fiber 150 at a precise distance from an edge of the substrate 122 and/or at a precise angle. The connectors 120-1, 120-2 may each include a light field input/output port 140 that may be located, for example, at a first end of the groove 124 that is opposite a second end of the groove 124 that receives the optical fiber 150.

As is further shown in FIG. 2, each substrate 122 may include at least one focusing reflective element 130. In some embodiments, the focusing reflective element 130 may comprise a pair of optical mode field converters 130-1, 130-2, which may be implemented as photonic optical mode field converters. As is discussed in greater detail in the aforementioned '908 application, a variety of different technologies may be used to implement photonic optical mode field converters 130-1, 130-2 including, for example, photonic tapered waveguides, photonic crystals or grating couplers, and photonic lenses. A light field that is output by an optical source such as the optical fiber 150 may be passed through these photonic optical mode field converters 130-1, 130-2 to either compress the light field into a smaller area light field (when passed through the photonic optical mode field converter 130 in a first direction) or to expand the light field into a larger area light field (when passed through the photonic optical mode field converter 130 in the opposite direction). The fiber optic connectors according to embodiments of the present invention may provide a simple, convenient mechanism for terminating an optical fiber so that the light field of the optical fiber is precisely received by a photonics optical mode field converter without the need for the use of ferrules, epoxy, fiber polishing and the like that is necessary when conventional optical fiber termination techniques are used.

In some embodiments, the photonics optical mode field converters 130-1, 130-2 may be at least partly positioned within their respective grooves 124. This may provide a convenient way of directing the light field output by the optical fibers 150 onto and through the photonic optical mode field converters 130. The photonics optical mode field converters 130-1, 130-2 may be formed within their respective grooves 124 using semiconductor, MEMS or micro-machining fabrication techniques, or may be separately formed and then positioned within the groove 124 or in another location where they are positioned to receive an optical signal output by the respective optical fibers 150-1, 150-2. While not shown in FIG. 2, in some embodiments one or more reflective surfaces may be provided on, for example, sidewalls of the groove 124.

It will be appreciated, however, that while in some embodiments the photonic optical mode field converters 130 are positioned within the groove 124, in other embodiments, the photonic optical mode field converters 130 may not be within the groove 124. For example, in some embodiments, the photonic optical mode field converter 130 may comprise a tapered waveguide that is positioned adjacent the groove 124 and configured to receive a light field output from the optical fiber 150 that is within the groove 124. In other embodiments, the groove 124 may be disposed at an angle with respect to a top surface of the substrate 122 so that once the optical fiber 150 is placed within the groove 124 the end of the optical fiber 150 slants upward toward the top surface of the substrate so that the light field output by the optical fiber 150 is received by a photonic optical mode field converter 130 (or other element) that is formed or positioned on a top surface of the substrate 122.

The connectors 120-1, 120-2 may each include a light field input/output port 140 at which light that is passed through the photonic optical mode field converter 130 is output from the connector, or which receives light from an external source and passes the received light to the photonic optical mode field converter 130. In some embodiments, the light field input/output port 140 may be an end of the groove 124. As is further shown in FIG. 2, the light field output through the light field input/output port 140 of the first connector 120-1 may be aligned with the light field input/output port 140 of the second connector 120-2. Thus, the light field input/output ports 140 of connectors 120-1, 120-2 may be arranged in a facing relationship so that an optical signal transmitted along connectorized fiber optic cable 110-1 may be transferred to connectorized fiber optic cable 110-2.

While not shown in FIG. 2, the fiber optic connectors 120 may each include housing structures that are configured to mate with each other so that the two connectors 120 may be joined together so that the light field input/output ports 140 thereof will be precisely aligned. In other embodiments, the connectors 120 may each have a housing that is designed to mate with a fiber optic adapter (not shown). The fiber optic adapter may be designed to precisely align the connectors on two fiber optic cables or to align the connector of a fiber optic cable with an output of optical equipment such as a VCSEL, a distributed feedback grating laser or an optical receiver.

In some embodiments, the optical fibers 150 that are terminated into each connector 120 may comprise few-mode optical fibers (e.g., an optical fiber that is sized to transmit an 850 nm optical signal as a single-mode optical signal or a conventional single mode optical fiber). In such embodiments, the optical fibers 150 may, for example, each have a core having a diameter on the order of about five microns. The photonic optical mode field converter 130-1 in the first fiber optic connector 120-1 may comprise a structure that expands the light field output by the optical fiber 150-1 into a larger area light field (e.g., a light field having a diameter on the order of fifty microns). This expanded light field is output from the first connector 120-1 through light field input/output port 140 and is received through the light field input/output port 140 of the second connector 120-2. The light field that is input to the second connector 120-2 then passes through photonic optical mode field converter 130-2 of the second connector 120-2 where it is compressed into a smaller area light field (e.g., a light field having a diameter on the order of five microns). The photonic optical mode field converter 130-2 of the second fiber optic connector 120-2 directs this small area light field into the optical fiber 150-2 that is terminated into the second connector 120-2. In this manner, the first and second fiber optic connectors 120-1, 120-2 provide a means for transferring an optical signal that is carried on the optical fiber 150-1 of the first connectorized fiber optic cable 110-1 onto the optical fiber 150-2 of the second connectorized fiber optic cable 110-2.

As explained above, the photonic optical mode field converters 130-1, 130-2 may expand the light field at the point of the connection from a small area light field to a much larger area light field. This may have various advantages. For example, if the first and second connectors 120 are not perfectly aligned, then some of the light that is output from the first connector 120-1 will not impinge on the light field input/output port 140 of the second connector 120-2, and thus a portion of the optical signal that is being transmitted will be lost at the connection between the first and second connectorized cable assemblies 110-1, 110-2. If a small area light field (e.g., a light field having a diameter of, for example, five microns) is passed between the first and second fiber optic connectors 120, then a very small alignment error (e.g., an error of one or two microns) can result in significant attenuation of the optical signal. However, since in the embodiment of FIG. 2 a large area light field having a diameter of, for example, fifty microns, is passed between the first and second fiber optic connectors 120, then a small alignment error may not significantly impact the optical signal as only a small amount of the optical signal will be lost due to this alignment error.

As another example, the first and second connectors 120 may be connected and detached in the field as part of equipment changes, patching changes and the like. As technicians in the field attach and detach various fiber optic connectors, there is a danger that dust particles or other particles may come to rest on the ends of the optical fibers that terminate in these connectors. A typical dust particle may have a diameter of, for example, about one micron, while a core of a single-mode optical fiber may have a diameter of, for example, about five microns. Consequently, if one or more dust particles come to rest on the end of an optical fiber in a conventional connection of single mode optical fibers, then these dust particles can potentially block a significant percentage of the light field, thereby degrading the optical communications link. However, by expanding the diameter of the light field at the point of the connection by, for example, a factor of ten, the area of the light field is expanded by a factor of one hundred. As such, the potentially degrading effect of a dust particle may be significantly reduced by expanding the light field at the point of connection.

Figure 3:
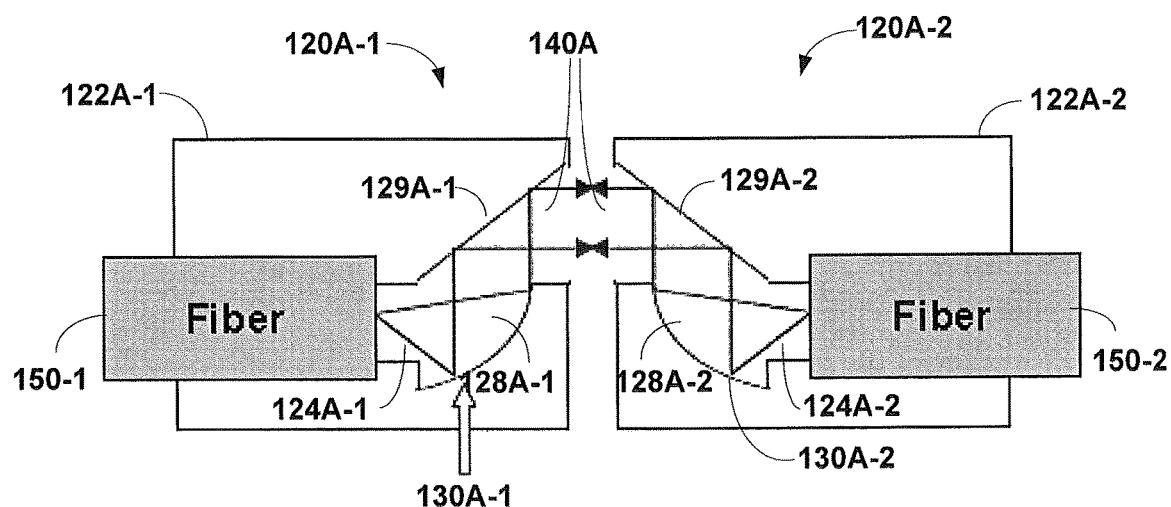
FIG. 3 is a schematic plan view of a particular implementation of the fiber optic connectors included on the connectorized fiber optic cables of FIG. 2 in which the optical mode field converters are implemented using concave mirrors.
Figure 4:
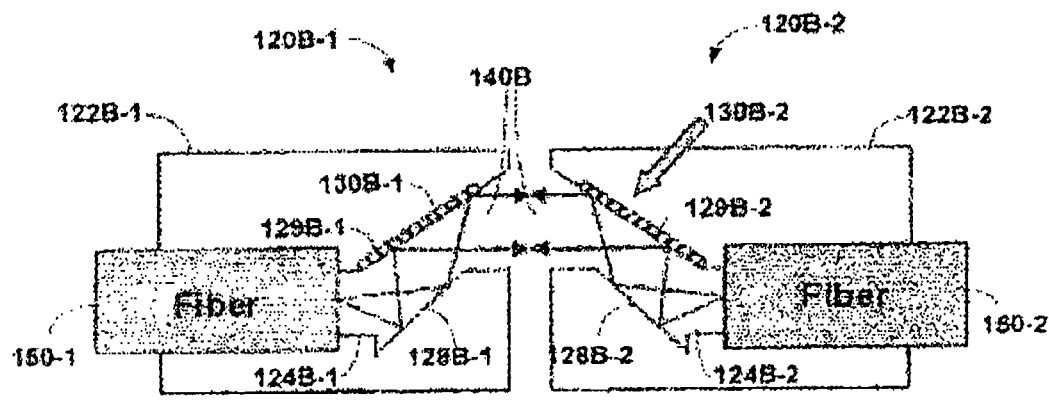
FIG. 4 is a schematic plan view of a particular implementation of the fiber optic connectors included on the connectorized fiber optic cables of FIG. 2 in which the optical mode field converters are implemented using Holographic Bragg Grating reflectors.

FIGS. 3 and 4 are schematic plan views of two example implementations of the fiber optic connectors 120-1 and 120-2 that are mounted on the respective connectorized fiber optic cables 110-1, 110-2 of FIG. 2. In particular, FIG. 3 illustrates a pair of fiber optic connectors 120A-1, 120A-2 (which could be used to implement the fiber optic connectors 120-1, 120-2 of FIG. 2) in which the photonic optical mode field converters 130 are implemented as concave mirrors 130A-1, 130A-2, while FIG. 4 illustrates a pair of fiber optic connectors 120B-1, 120B-2 (which also could be used to implement the fiber optic connectors 120-1, 120-2 of FIG. 2) in which the photonic optical mode field converters 130 are implemented using Holographic Bragg Grating ("HBG") reflectors 130B-1, 130B-2.

As shown in FIG. 3, the first and second fiber optic connectors 120A-1, 120A-2 each include photonic optical mode field converters 130 in the form of reflective concave mirrors 130A-1, 130A-2. These concave mirrors 130A-1, 130A-2 may be positioned at a predetermined distance from the end of the respective optical fibers 150-1, 150-2. In the depicted embodiment, the grooves 124 in the substrates 122 may be implemented as groove 124A-1, 124A-2 that include respective angled sections 128A-1, 128A-2. As such, only a portion of each groove 124A-1, 124A-2 is collinear with the optical fibers 150-1, 150-2 that are received within the respective grooves 124A-1, 124A-2. The concave mirrors 130A-1, 130A-2 may be formed on a sidewall of their respective grooves 124A-1, 124A-2. In some embodiments, the concave mirrors 130A may simply comprise a concave-shaped sidewall of the groove 124A that is etched in a manner to have a reflective surface. In other embodiments, each concave mirror 130A may be formed by depositing a second layer on the sidewall of its respective groove 124A using, for example, thin film deposition techniques. The concave mirror 130A-1 may be sized to be at least as large as the expanded light field that will impinge thereon when an optical signal exits the optical fiber 150-1 of the first fiber optic connector 120A-1 and expands as the light traverses the distance from the end of the optical fiber 150-1 to the concave mirror 130A-1. The concave mirror 130A-2 may be similarly sized with respect to the expanded light field output by optical fiber 150-2.

The portions of grooves 124A-1, 124A-2 that receive the concave mirrors 130A-1, 130A-2 may be deepened and/or widened as necessary to accommodate the concave mirrors 130A-1, 130A-2. Moreover, the upper wall of each groove 124A is angled with respect to a longitudinal axis of the portion of the groove 124A that receives the respective optical fibers 150-1, 150-2 so that the grooves 124A-1, 124A-2 each have a respective angled sidewall 129A-1, 129A-2. Each groove 124A ends at the light field input/output port 140A. A light field that is output from the optical fiber 150-1 of the first fiber optic connector 120A-1 expands as it exits the optical fiber 150-1 and impinges on the concave mirror 130A-1. The mirror 130A-1 reflects the light field as a collimated beam at about a ninety degree angle (in the depicted embodiment, although it will be appreciated that other angles may be used) so that the light field is directed onto the angled sidewall 129A-1. The angled sidewall 129A-1 may be a reflective surface that redirects the light field at an angle of about ninety degrees so that the light field exits the groove 124A-1 through the light field input/output port 140A where it passes to the light field input/output port 140A of the second fiber optic connector 120A-2.

The second fiber optic connector 120A-2 may be identical to the first fiber optic connector 120A-1 that is described above, and hence the light field that is received within light field input/output port 140A of the second fiber optic connector 120A-2 undergoes the reverse of the process described above. In particular, the light field reflects off of the angled sidewall 129A-2 at a ninety degree angle towards concave mirror 130A-2, which focuses the light field into a much smaller light field and directs the focused light field into the optical fiber 150-2 of the second fiber optic connector 120A-2.

As shown in FIG. 4, in another embodiment, the photonic optical mode field converters 130 of the fiber optic connectors 120 of FIG. 2 may be implemented as HBG reflectors 130B-1, 130B-2 that are included in a pair of fiber optic connectors 120B-1, 120B-2. The HBG reflectors 130B are structures that receive incident light and then reflect the received light at a different angle, where the angle of reflection will vary based on the wavelength of the incident light. In the embodiment of FIG. 4, a wave division multiplex signal that includes light at a variety of different wavelengths may be output from the optical fiber 150-1 of the first fiber optic connector 120B-1. The substrate 122B-1 of fiber optic connector 120B-1 includes a groove 124B-1 that has a first angled sidewall 128B-1 and a second angled sidewall 129B-1. The second angled sidewall 129B-1 may be formed as an HBG reflector 130B-1 or may have an HBG reflector 130B-1 positioned thereon. The wave division multiplex signal that is output by optical fiber 150-1 is reflected by the first angled sidewall 128B-1 of groove 124B-1 toward the HBG reflector 130B-1. The HBG reflector 130B-1 is positioned at a distance and angle with respect to the first angled sidewall 128B-1 so that the light received from the first angled sidewall 128B-1 exits the HBG reflector 130B-1 as a large area light field in the form of a collimated beam that is passed out of the first fiber optic connector 120B-1 through light input/output port 140B. The reverse process occurs in the second fiber optic connector 120B-2 so that the large area light field that is received from the first fiber optic connector 120B-1 is focused into a small area light field by the HBG reflector 130B-2 and then is directed into the optical fiber 150-2 of the second fiber optic connector 120B-2 by the first angled sidewall 128B-2.

The HBG reflectors 130B may be formed, for example, by etching the sidewalls of the grooves 124B. In other embodiments, the HBG reflectors 130B may be formed as gratings on the sidewalls of the grooves 124B. In still other embodiments, the HBG reflectors 130B may be formed separately and deposited within the grooves 124B.

While FIGS. 3 and 4 illustrate two examples of fiber optic connectors 120A and 120B that use particular types of photonic optical mode field converters 130A, 130B, it will be appreciated that these examples are exemplary in nature and that other photonic optical mode field converters or even non-photonic optical mode field converters may be used instead.

Pursuant to further embodiments of the present invention, connectorized fiber optic cables are provided that include "stackable" connectors that can be connected together by stacking the connectors of two cables vertically or horizontally (for example). FIGS. 5-10 illustrate example embodiments of such connectorized fiber optic cables.

Figure 5:
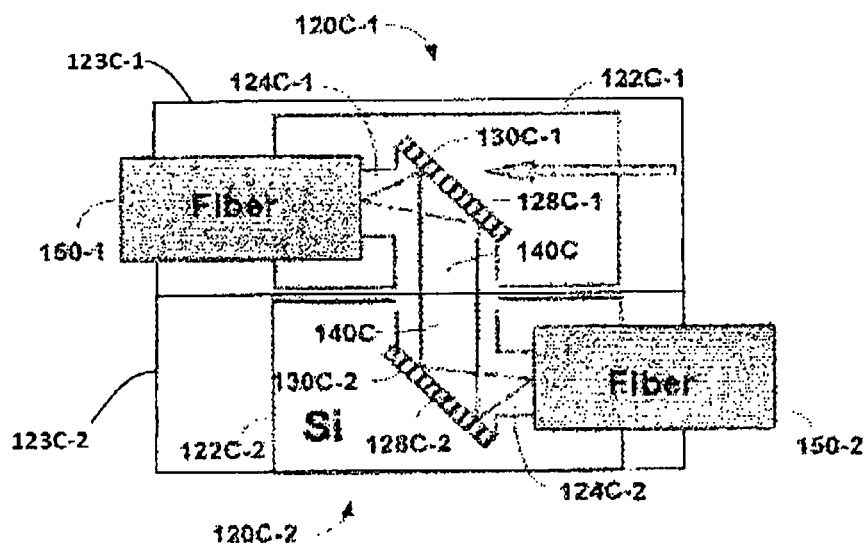
FIG. 5 is a schematic plan view of a pair of fiber optic connectors according to certain embodiments of the present invention that form a connection between optical fibers that are not collinear.

As shown in FIG. 5, a pair of fiber optic connectors 120C-1, 120C-2 may be provided that are designed to be stacked in, for example, a side-by-side manner to form a connection. The first fiber optic connector 120C-1 includes a substrate 122C-1 that has a groove 124C-1 formed therein and an optical fiber 150-1 that is positioned within one end of the groove 124C-1. The substrate 122C-1 is mounted in a first housing 123C-1. The other end of the groove 124C-1 has an angled end wall 128C-1 which has an HBG reflector 130C-1 formed therein or thereon. The HBO reflector 130C-1 may be identical to the HBG reflector 130D-1 discussed above with reference to FIG. 4. The HBO reflector 130C-1 receives a light field that is output from the optical fiber 150-1 and directs that light field as a collimated beam through a light field input/output port 140C that is located in a sidewall of the substrate 122C-1. The first fiber optic connector 120C-1 may be very similar to fiber optic connector 120B-1 that is discussed above with respect to FIG. 4, with the primary change being that the second angled sidewall 129B-1 that is provided in fiber optic connector 120B-1 may be omitted in connector 120C-1 as the light field is output through a sidewall of the of substrate 122C-1 as opposed to being output through an end of the substrate 122C-1 that is opposite the optical fiber 150-1. The second fiber optic connector 120C-2, having a second substrate 122C-2 mounted in a second housing 123C-2, may be identical to the first fiber optic connector 120C-1, and hence further discussion thereof will be omitted.

Figure 6:
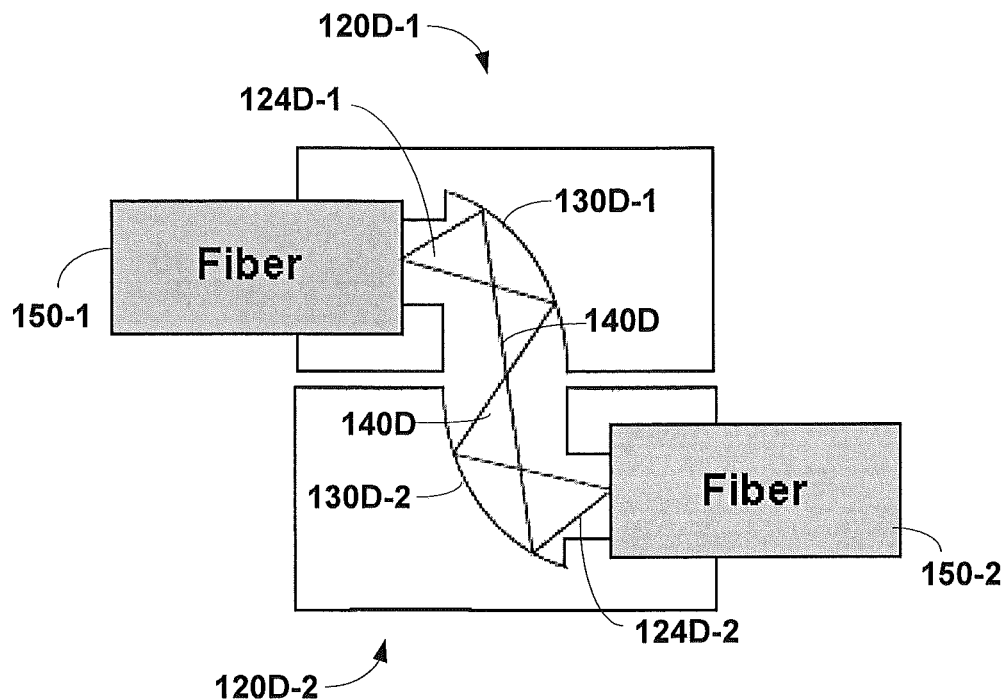
FIG. 6 is a schematic plan view of a pair of fiber optic connectors according to further embodiments of the present invention that form a connection between optical fibers that are not collinear.

FIG. 6 depicts another pair of stackable fiber optic connectors 120D-1, 120D-2 according to further embodiments of the present invention. The fiber optic connectors 120D may be almost identical to the fiber optic connectors 120C of FIG. 5, except that the HBG reflectors 130C-1, 130C-2 that are used in the fiber optic connectors 120C-1, 120C-2 are replaced in the fiber optic connectors 120D-1, 120D-2 with concave mirrors 130D-1, 130D-2.

Figure 7:
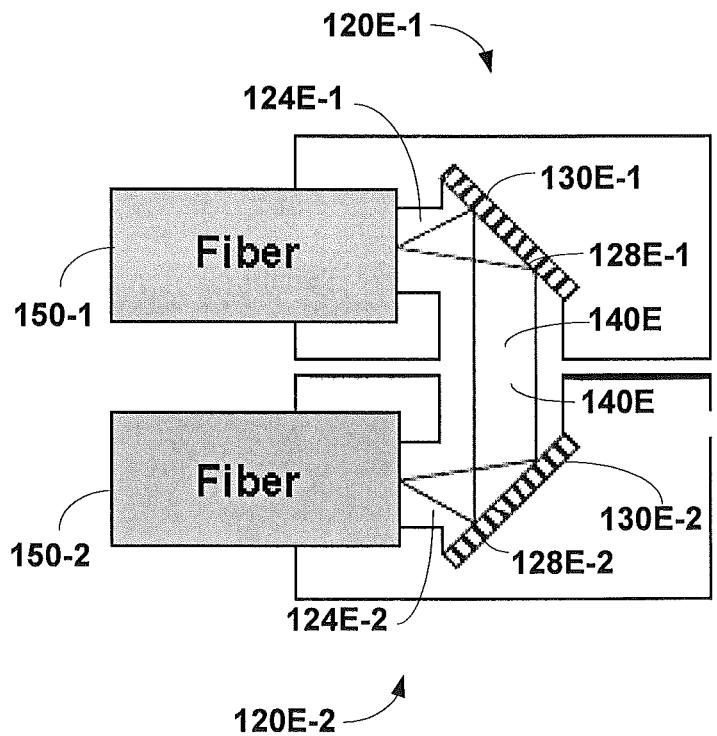
FIG. 7 is a schematic plan view of a pair of mated fiber optic connectors according to certain embodiments of the present invention in which the optical fibers that are connected by the mated connection extend from the same side of the mated fiber optic connectors.

FIG. 7 illustrates yet another pair of stackable fiber optic connectors 120E-1, 120E-2 according to still further embodiments of the present invention. The first (upper) fiber optic connector 120E-1 may be identical to the first connector 120C-1 that is depicted in FIG. 5. The second (lower) fiber optic connector 120E-2 may almost be identical to the second fiber optic connector 120C-2 of FIG. 5, with the only difference being that the second fiber optic connector 120E-2 is designed to have the optical fiber 150-2 enter the left hand side of the fiber optic connector 120E-2 (as opposed to through the right hand side as is the case with fiber optic connector 120C-2).

Figure 8:
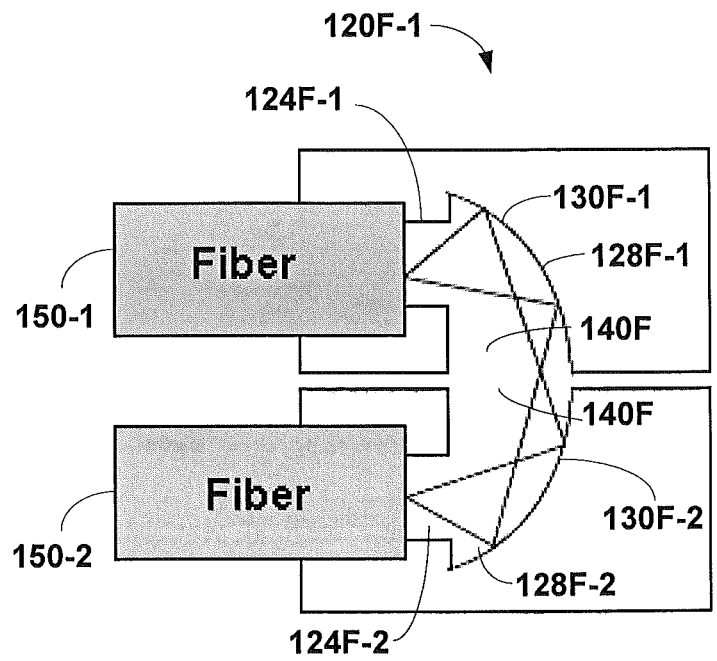
FIG. 8 is a schematic plan view of a pair of mated fiber optic connectors according to further embodiments of the present invention in which the optical fibers that are connected by the mated connection extend from the same side of the mated fiber optic connectors.

FIG. 8 depicts a pair of stackable fiber optic connectors 120E-1, 120E-2 according to still further embodiments of the present invention. The fiber optic connectors 120E-1, 120E-2 may be almost identical to the fiber optic connectors 120E-1, 120E-2 of FIG. 7, except that in the fiber optic connectors 120E-1, 120E-2 the HBG reflectors 130E-1, 130E-2 are replaced with concave mirrors 130E-1, 130E-2.

Figure 9:
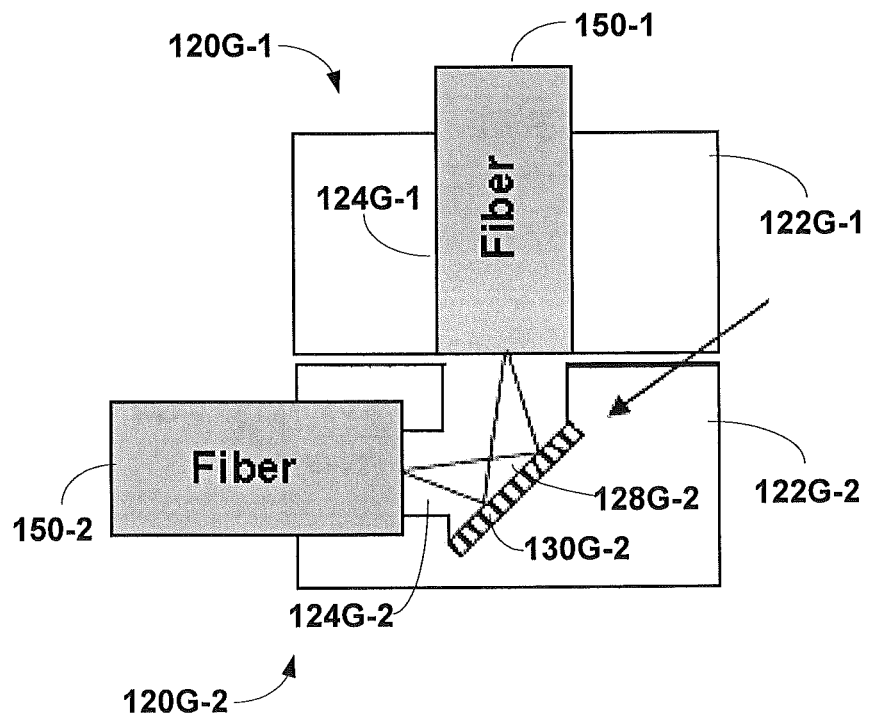
FIGS. 9-11 are schematic plan views of mated fiber optic connectors that connect optical fibers that define oblique angles according to certain embodiments of the present invention.

FIG. 9 illustrates yet another pair of stackable fiber optic connectors 120G-1, 120G-2 according to embodiments of the present invention that connect at a ninety degree angle. The first (upper) fiber optic connector 120G-1 may simply comprise a substrate 122G-1 that has a groove 124G-1 therein. An optical fiber 150-1 is positioned in the groove 124G-1. The second (lower) fiber optic connector 120G-2 may be identical to the second (lower) fiber optic connector 120E-2 of FIG. 7. As shown in FIG. 9, light that is output from optical fiber 150-1 of the second fiber optic connector 120G-2 expands as it exits the optical fiber 150-2 and impinges on the HBG reflector 130G-2. The HBG reflector 130G-2 reflects the light field at about a ninety degree angle and focuses the light field so that the light field is directed into the optical fiber 150-1 of connector 120G-1.

Figure 10:
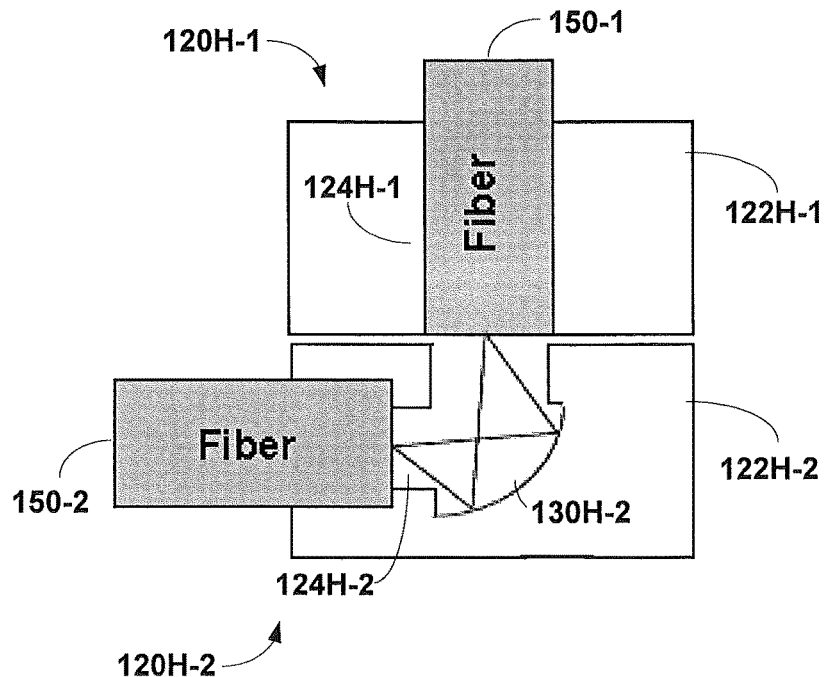

FIG. 10 depicts another pair of stackable fiber optic connectors 120H-1, 120H-2 according to still further embodiments of the present invention. The fiber optic connectors 120H-1, 120H-2 may be almost identical to the fiber optic connectors 120G-1, 120G-2 of FIG. 9, except that in the fiber optic connectors 120H-1, 120H-2 the HBG reflector 130G-2 of fiber optic connector 120G-2 is replaced with concave mirror 130H-2.

Figure 11:
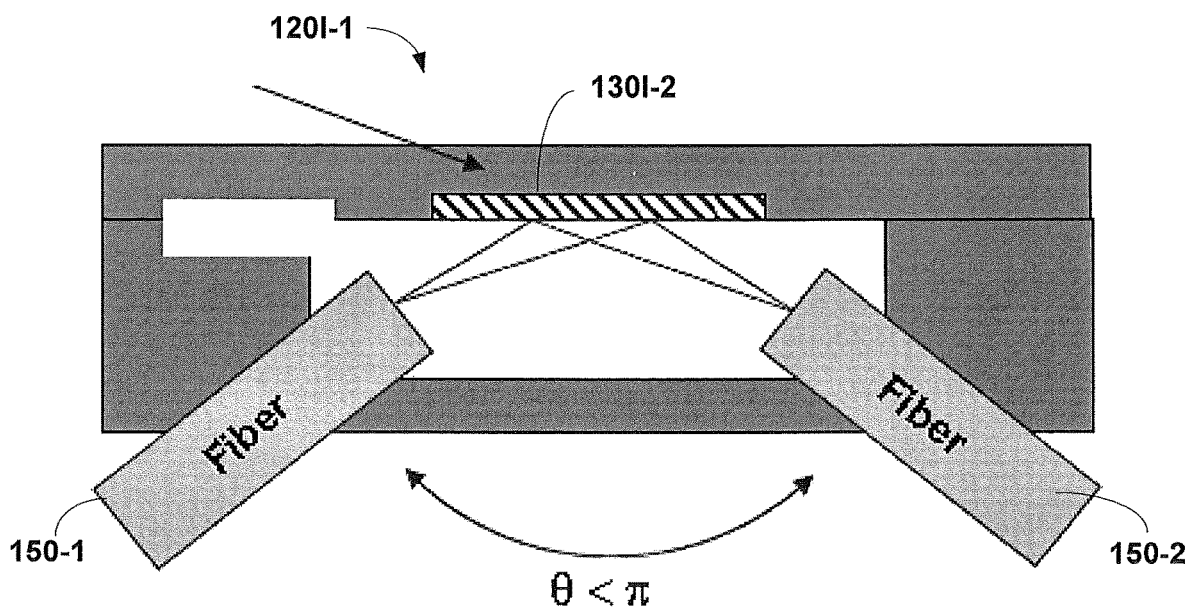

Finally, FIG. 11 illustrates that the HBG reflector that is included in connectors according to embodiments of the present invention may be designed to pass light between two optical fibers at any selected angle. While in FIG. 11 the two optical fibers 150-1, 150-2 are illustrated as entering a common housing, it will be appreciated that the optical fibers 150-1, 150-2 may be in separate housings that connect so that the optical fibers direct light fields onto and receive light fields from the HBG reflector 1301-2.

The fiber optic connectors 120C through 120I of FIGS. 5-11 may be used to optically connect two optical fibers 150-1, 150-2 that are not collinear. This is in contrast to conventional fiber optic connectors, which typically align the optical fibers 150-1, 150-2 of two fiber optic cables along a common axis so that light may be passed from the first optical fiber 150-1 onto the second optical fiber 150-2. The ability to optically connect two optical fibers 150-1, 150-2 that are not collinear may have a number of advantages in certain applications. For example, in traditional fiber optic patch panels, shelves, cabinets and the like that provide connection points for pairs of fiber optic cables, a first plurality of fiber optic cables typically enter or are arranged on one side of the patch panel, shelf or cabinet and a second plurality of fiber optic cables enter or are arranged on one side of the patch panel, shelf or cabinet. Such an arrangement is typically used because fiber optic cables typically have associated "bend radiuses" that define the degree of curvature that the cable can handle without damaging the optical fibers therein and/or without unacceptably degrading the transmission of the optical signals that may be transmitted over those optical fibers. As these bend radiuses tend to be fairly large, it is often impractical to have both fiber optic cables that are to be connected entering from the same side of the patch panel, shelf or cabinet. In contrast to such conventional connectorized fiber optic cable, connectorized fiber optic cables 110 that include the fiber optic connectors 120E or 120F of FIGS. 7 and 8 above can both enter a fiber optic patch panel, shelf or cabinet from the same side and can together form a 180 degree loop in an extremely small space such as, for example a diameter of 1 millimeter or less. In many applications it may be inconvenient to need to provide a technician access to both sides of a patch panel, shelf or cabinet and thus the connectorized fiber optic cables according to certain embodiments of the present invention may facilitate the use of patch panels, shelves, cabinets and other fiber optic cable connection apparatus that have most or all of the fiber optic cables entering from the same side of the structure. In other words, the fiber optic connectors according to embodiments of the present invention may allow for sharp bends in the optical communications path, which may greatly simplify matters by reducing or eliminating any need for minimum curve radiuses in the fiber optic cables at or around connection points.

Figure 12:
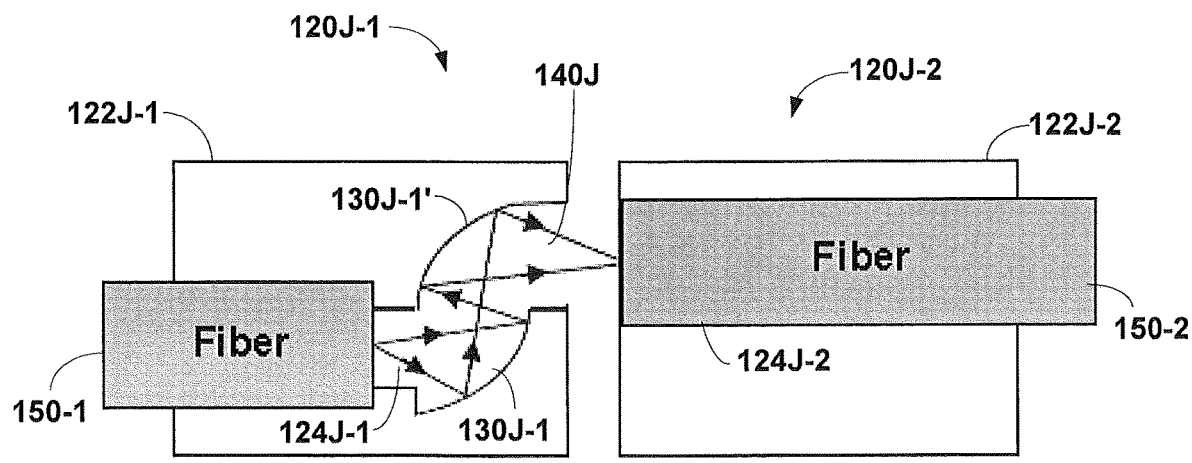
FIGS. 12-13 are schematic plan views of pairs of fiber optic connectors according to further embodiments of the present invention.
Figure 13:
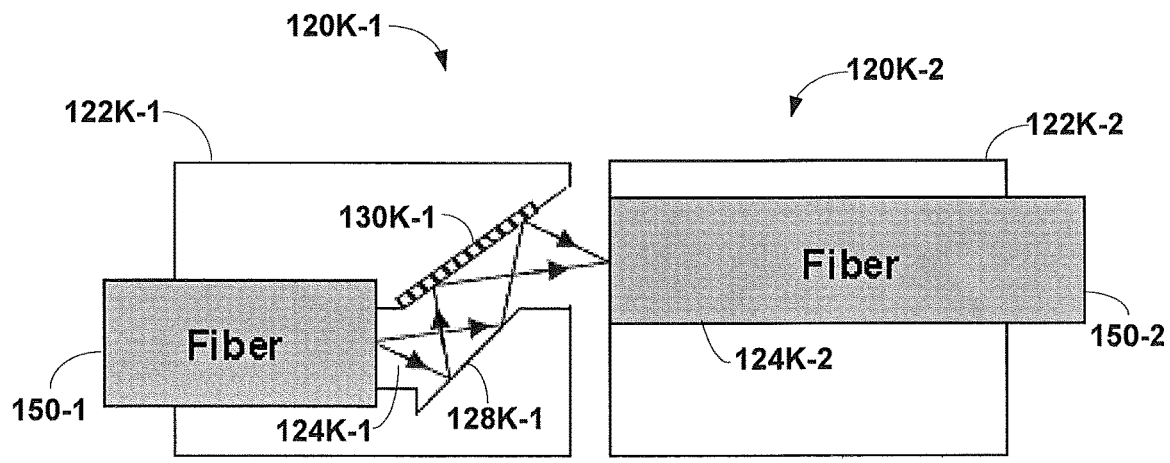

Pursuant to still further embodiments of the present invention, connectorized fiber optic cables may be provided that are suitable for use with conventional fiber optic connectors. FIGS. 12 and 13 schematically illustrate two such connectorized fiber optic cables.

In particular, FIG. 12 illustrates a pair of fiber optic connectors 120J-1, 120J-2 according to embodiments of the present invention. As is shown in FIG. 12, the fiber optic connector 120J-1 includes a substrate 122J-1 that has a groove 124J-1 formed in an upper surface thereof. The fiber optic connector 120J-1 includes two photonic optical mode field converters 130J-1, 130J-1' in the form of first and second concave mirrors 130J-1, 130J-1'. Together, the first and second concave mirrors 130J-1, 130J-1' may be used to pass a light field that is output from the optical fiber 150-1 into, for example, an optical fiber of a fiber optic cable that has a like-sized core. In particular, the first optical mode field converter 130J-1 may expand the light field output by the optical fiber 150-1, while the second optical mode field converter 130J-2 may focus the light field received from the optical mode field converter 130J-1 and direct the compressed light field into the optical fiber 150-2. In the embodiment depicted in FIG. 12, the second fiber optic connector 120J-2 comprises a substrate 122J-2 that has a groove 124J-2 that has an optical fiber 150-2 therein. However, it will be appreciated that in other embodiments, the fiber optic connector 120J-2 could comprise a conventional fiber optic connector that has an optical fiber mounted in a ferrule.

FIG. 13 illustrates a pair of fiber optic connectors 120K-1, 120K-2 that are similar to the fiber optic connectors 120J-1, 120J-2 of FIG. 12, except that the first and second concave mirrors 130J-1, 130J-1' are replaced with an angled sidewall 128K-1 in a groove 124K-1 and an HBG reflector 130K-1 to achieve the same result.

As shown above, pursuant to embodiments of the present invention, high precision fiber optic connectors may be provided that may be used to connectorize fiber optic cables. In some embodiments, the fiber optic connectors may be separately fabricated from the cable, and the connector may be fabricated to have one or more optical fiber "pigtails" (i.e., a short length of optical fiber) that, for example, extend outside the connector housing. These fiber optic connectors may then be used to terminate a fiber optic cable by fusing or otherwise attaching each optical fiber pigtail to a corresponding optical fiber of the fiber optic cable and connecting other components of the fiber optic cable (e.g., one or more of the cable jacket, strength members, etc.) to the connector housing. In other embodiments, the optical fibers of an optical cable may be directly terminated into the fiber optic connectors according to embodiments of the present invention. The fiber optic connectors according to embodiments of the present invention may thus replace the polished ferrule that is typically used in conventional fiber optic connectors—which is expensive to make and time-consuming to install—with a substrate that is manufactured in a foundry. The fiber optic connectors according to embodiments of the present invention may also not have any moving parts, which may make them more reliable and robust. Additionally, the polishing steps and expensive manual precision assembly operations that are generally necessary with conventional fiber optic connectors are not necessary with respect to various of the fiber optic connectors according to embodiments of the present invention.

The connectors according to embodiments of the present invention may be mass produced in a factory setting using semiconductor fabrication and/or micro-machining techniques. These techniques may be very precise as lithography and micro-machining techniques are now very advanced, and hence may provide connectors with precisely aligned optical fibers that may have better tolerances as compared to conventional fiber optic connectors. As the connectors can be mass-produced, they may be manufactured more quickly and more cheaply than conventional fiber optic connectors, and product development may be more agile. Moreover, semiconductor and MEMS foundry operations are well-known, proven processes that may allow quick and relatively inexpensive scaling up for the mass production of fiber optic connectors.

In some embodiments, the optical mode field converters 130 may comprise focusing reflectors. Examples of such focusing reflectors 130 are concave mirrors, HBG reflectors and digital Fresnel structures. These focusing reflectors 130 may be formed in a substrate 122 that holds the optical fiber 150 in a groove 124. Reflective layers formed of materials such as, for example, silver, may be deposited on the substrate using, for example, thin film deposition techniques, sputtering and the like. The focusing reflectors 130 may be positioned in the groove 124 that holds the optical fiber 150 so that the focusing reflector 130 receives, reflects and expands the light field output by the optical fiber 150 (or in the other direction, receives a light field, focuses or collimates it, and reflects it into the optical fiber 150). Additional reflecting elements (e.g., non-focusing reflective elements) may also be provided in the groove 122 to route the light field in a desired direction.

The ability to route or steer the light field output by the optical fiber 150 allows the design of connectors that can mate in a wide variety of orientations including horizontally side-by-side, vertically, at right angles, at oblique angles, etc. Additionally, the optical fibers of two mated connectors may extend from the same side of the mated pair of connectors, as shown in FIGS. 7 and 8.

Pursuant to still further embodiments of the present invention, connectors for fiber optic cables are provided in which photonic optical mode field converters are fabricated and then positioned on or within a substrate. The substrate may comprise, for example, a chip that is cut from a wafer that is processed in a semiconductor processing facility using lithography, etching or other semiconductor processing techniques, or a chip that us processed using MEMS or micromachining techniques. A groove is provided in the substrate. The groove may be cut into the substrate, the groove may be formed by depositing layers that define the groove, and a substrate having a groove may be formed in a single processing step. An optical fiber is then positioned in the groove so that the light field output by the optical fiber is passed to the photonic optical mode field converter. The substrate including the photonic optical mode field converter and the optical fiber may be encased in a housing to provide a fiber optic connector. In some embodiments, the optical fiber may be an optical fiber pigtail and this pigtail may be joined by fusing to an optical fiber of a fiber optic cable to provide a connectorized fiber optic cable. In other embodiments, the optical fiber of the connector may be an end portion of an optical fiber of a fiber optic cable that is terminated into the housing to connectorize the fiber optic cable. Example embodiments of such fiber optic connectors and connectorized fiber optic cables will now be discussed with reference to FIGS. 14-17.

Figure 14:
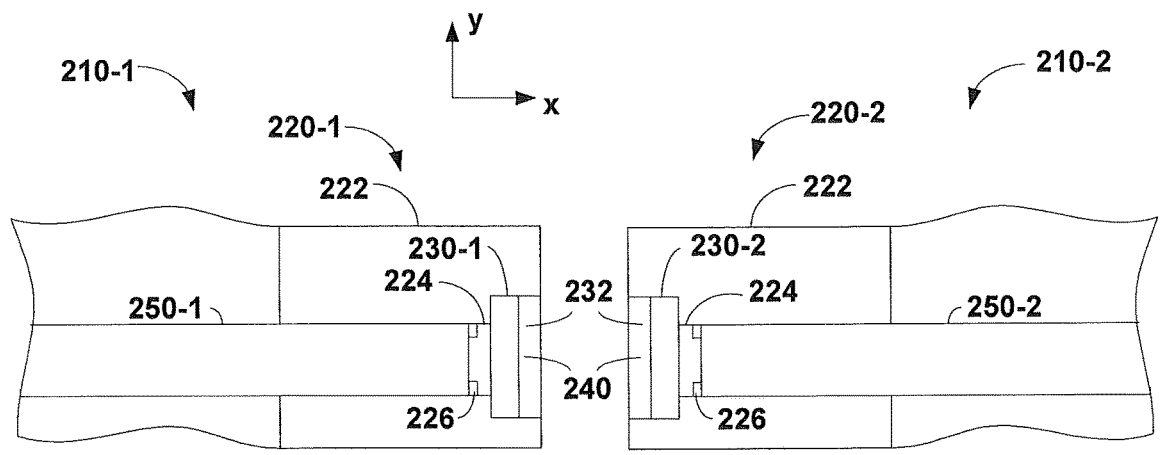
FIG. 14 is a schematic plan view of a pair of fiber optic connectors according to further embodiments of the present invention.

In particular, FIG. 14 is a schematic plan view of end portions of a pair of connectorized fiber optic cables 210-1, 210-2. Connectorized fiber optic cable 210-1 includes a fiber connector 220-1 on one end thereof, and connectorized fiber optic cable 210-2 includes a fiber connector 220-2 on one end thereof. Each fiber optic connector 220 includes a substrate 222 that has a groove 224 therein. An optical fiber 250 is positioned in each groove 224. Both optical fibers 250 may comprise single-mode optical fibers, few-mode optical fibers or multi-mode optical fibers. The groove 224 may comprise, for example, a V-shaped groove, a U-shaped groove or a semi-circular groove. Each substrate 222 may include a cavity 232. An optical mode field converter 230 may be disposed at least partly in the respective cavities 232.

The groove 224 and/or the cavity 232 may be formed, for example, via photolithography and etching of the substrate 222 using semiconductor fabrication techniques. As is known to those of skill in the art, extremely precise etching of substrates such as semiconductor substrates can be performed using photolithography and etching, and thus the groove 224 on each fiber optic connector 220 that receives the optical fiber 250 may be precisely aligned with the cavity 232 in both the transverse and vertical directions (the y- and z-directions, respectively, in FIG. 14, where the z-direction is into the page). One or more stops 226 may be provided in the groove 224 that may be used to precisely control the position of the end of the optical fiber 250 in the longitudinal direction (the x-direction in FIG. 14).

The optical fiber 250 may be inserted into the groove 224 so that the end of the optical fiber 250 abuts against the stops 226. The stops 226 may be sized so that they are longitudinally aligned with a coating layer of the optical fiber 250 and/or with a cladding layer of the optical fiber 250, but so that they are not longitudinally aligned with the core of the optical fiber 250. Consequently, a light field that is output from the end of the optical fiber 250 may generally not be blocked by the stops 226 and may pass through the remainder of the groove 224 to the optical mode field converter 230.

The optical mode field converter 230 may be formed separately from the substrate 222, and may be placed at least partly in the cavity 232. One or both of the cavity 232 and the optical mode field converter 230 may include alignment features (not shown) such as sidewalls, stops, ledges, end walls, etc. that may be used to precisely position the optical mode field converter 230 at a desired location within the cavity 232 so the optical mode field converter 230 will receive an optical signal output by the optical fiber 250. A housing of fiber optic connector 120 (not shown) may be used to hold the optical fiber 250 and the optical mode field converter 230 in place. In some embodiments, two substrates 222 (which may be identical substrates) may be provided and the optical fiber 250 and the optical mode field converter 230 are captured between these two substrates 222. In such embodiments, each substrate 222 may have a groove 222 and a cavity 232. The connector housing may surround the two substrates 222 and hold them together.

The optical mode field converter 230 may receive a relatively smaller area light field that is output from the optical fiber 250 of fiber optic connector 220-1 and expands that light field into a larger area light field. The optical mode field converter 230-1 may output the light as a collimated beam. Fiber optic connector 220-2 is longitudinally aligned with connector 220-1 so that the light field output by optical mode field converter 230-1 is received by optical mode field converter 230-2 of fiber optic connector 220-2. Optical mode field converter 230-2 compresses the received light field into a smaller area light field that is passed through the groove 224 to optical fiber 250-2. In some embodiments, the housings of fiber optic connectors 220-1, 220-2 may have features that facilitate precisely longitudinally aligning fiber optic connectors 220-1 and 220-2. In other embodiments, an adapter (not shown) may be provided, and each fiber optic connector 220-1, 220-2 may be mated with the adapter so that the adapter is used to precisely align the fiber optic connectors 220-1, 220-2.

In some embodiments, the optical fibers 250-1, 250-2 may each comprise a single-mode optical fiber. The optical mode field converters 230-1, 230-2 may be used to expand and compress the light field so that at the point of connection a large area light field is coupled between the fiber optic connectors 220-1, 220-2. As discussed above, this approach may be used to reduce the optical coupling losses that may occur as a result of alignment errors, dust specks and the like. However, in other embodiments, the optical fibers 250-1, 250-2 may both comprise few-mode optical fibers or even multi-mode optical fibers.

Figure 15:
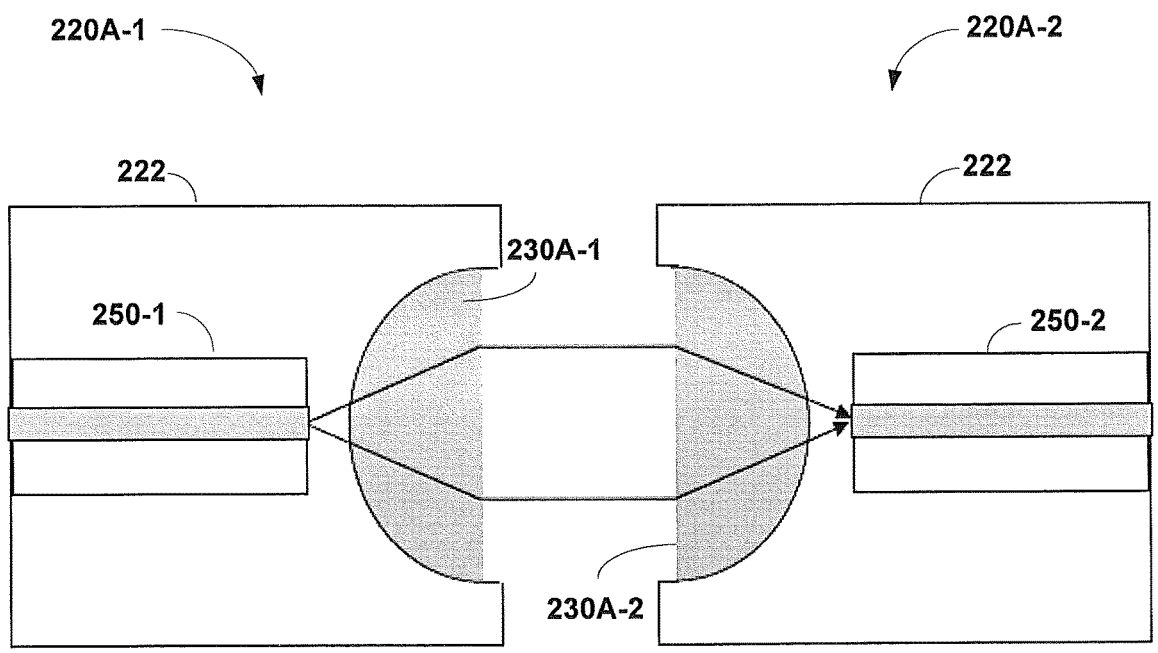
FIG. 15 is a schematic plan view of a pair of fiber optic connectors according to further embodiments of the present invention that each include a plano-convex lens optical mode field converter.
Figure 16:
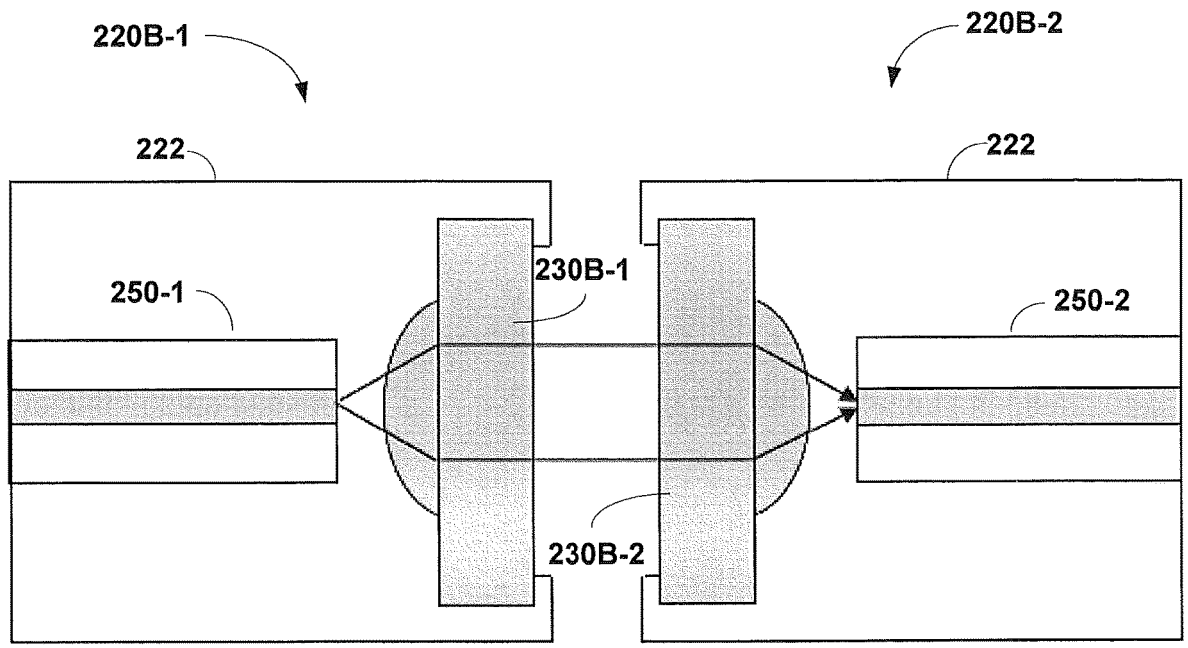
FIG. 16 is a schematic plan view of a pair of fiber optic connectors according to further embodiments of the present invention that each include a micro-lens or micro-lens array optical mode field converter.
Figure 17:
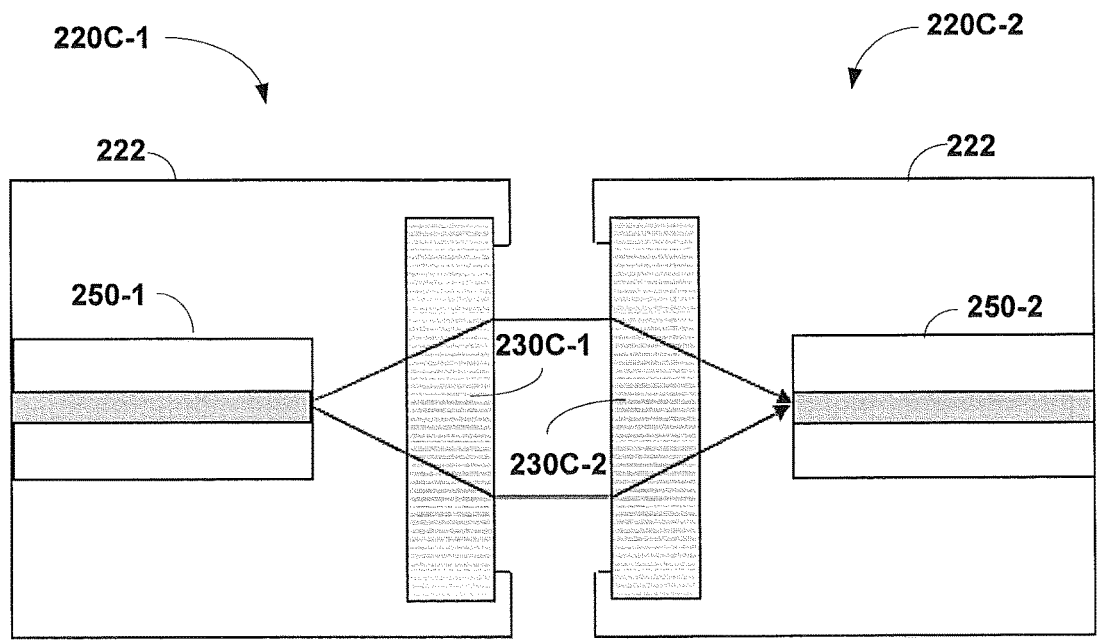
FIG. 17 is a schematic plan view of a pair of fiber optic connectors according to further embodiments of the present invention that each include a Fresnel lens optical mode field converter.

It will be appreciated that a wide variety of optical mode field converters 230-1, 230-2 may be used in the fiber optic connectors 220-1, 220-2 of FIG. 14. FIGS. 15-17 illustrate several example implementations. In particular, FIG. 15 illustrates an embodiment in which the optical mode field converters 230-1, 230-2 of FIG. 14 are implemented as plano-convex lenses such as, for example, Luneberg lenses 230A-1, 230A-2. FIG. 16 illustrates an embodiment in which the optical mode field converters 230-1, 230-2 of FIG. 14 are implemented using micro-lenses or micro-lens arrays 230B-1, 230B-2. FIG. 17 illustrates an embodiment in which the optical mode field converters 230-1, 230-2 of FIG. 14 are implemented using Fresnel lenses or diffractive lenses 230C-1, 230C-2. Example Fresnel and diffractive lenses that are suitable for use as optical mode field converters 230C-1, 230C-2 are disclosed in U.S. patent application Ser. No. 13/612,384, filed Aug. 29, 2012, the entire content of which is incorporated herein by reference as if set forth fully herein.

In the embodiments described above, an optical fiber is positioned within a groove in a substrate. The optical fiber may comprise a single mode optical fiber, a few mode optical fiber or a multi-mode optical fiber. It will also be appreciated that these optical fibers may be replaced instead with another fiber optic transmission medium such as, for example, a waveguide. This, it will be appreciated that many changes may be made to the above-described embodiments without departing from the scope of the present invention.

It will also be appreciated that typically if the first fiber optic connector of the pairs of fiber optic connectors depicted in the figures includes a single mode optical fiber, then the second fiber optic connector will likewise include a single mode optical fiber. Similarly, if the first fiber optic connector of the pairs of fiber optic connectors depicted in the figures includes a multi-mode optical fiber, then the second fiber optic connector will likewise include a multi-mode optical fiber. However, it will be appreciated that in some embodiments one of the fiber optic connectors may have, for example, a single mode optical fiber while the other fiber optic connector has a multi-mode optical fiber and the fiber optic connector designs may be modified accordingly.

Pursuant to further embodiments of the present invention, fiber optic connectors are provided that may be used to connect to two fiber optic cables that each include multiple optical fibers.

Figure 18:
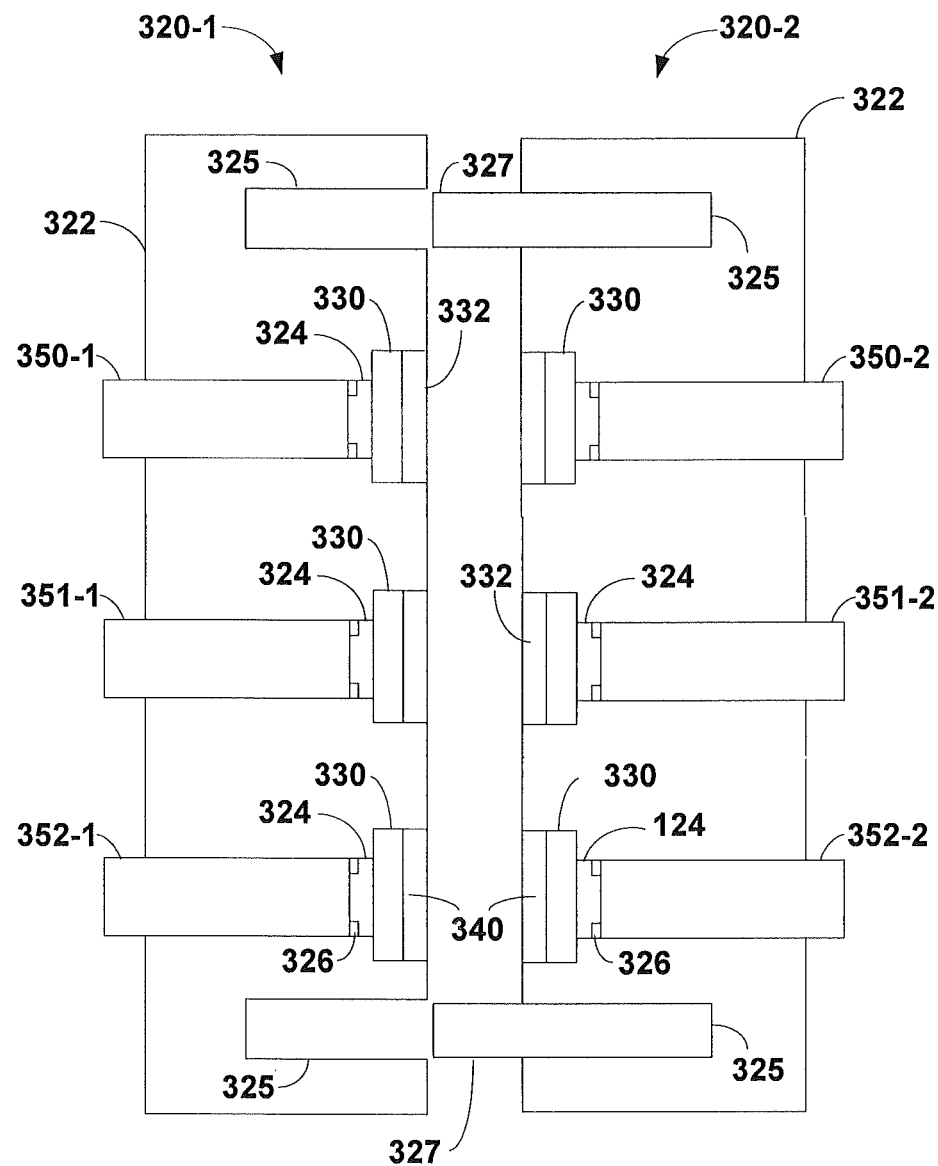
FIG. 18 is a schematic plan view of a pair of fiber optic connectors that each include multiple optical fibers according to further embodiments of the present invention.

For example, FIG. 18 is a schematic plan view of a pair of fiber optic connectors 320-1, 320-2 according to further embodiments of the present invention. The fiber optic connectors 320-1, 320-2 are similar to various of the fiber optic connectors discussed above, with the primary difference being that the fiber optic connectors 320-1, 320-2 each include three optical fibers 350-1, 351-1, 352-1, 350-2, 351-2, 352-2. The optical fibers 350-1, 351-1, 352-1, 350-2, 351-2, 352-2 may comprise single-mode optical fibers, few-mode optical fibers or multi-mode optical fibers. Each fiber optic connector 320-1, 320-2 includes a substrate 322. Three grooves 324 are provided in each the substrate 322 (e.g., V-shaped grooves, U-shaped grooves or semi-circular grooves), with each groove 324 configured to receive a respective one of the optical fibers 350-1, 351-1, 352-1, 350-2, 351-2, 352-2. The substrate 322 may include one or more cavities 332. In the depicted embodiment, each substrate includes three cavities 332, but it will be appreciated that less than three cavities 332 could be provided in other embodiments. An optical mode field converter 330 is positioned in each cavity 332. The grooves 324 and/or the cavities 332 may be formed, for example, via photolithography and etching of the substrate 322 using semiconductor fabrication techniques.

The optical fibers 350-1, 351-1, 352-1, 350-2, 351-2, 352-2 may be inserted into their respective grooves 324 so that the end of each optical fiber abuts against one or more stops 326. The cavities 332 and/or the substrates 322 that include the optical mode field converters 330 may include alignment features such as sidewalls, stops, ledges, end walls, etc. that may be used to precisely position the optical mode field converters 330 at desired locations within the cavities 332 so the optical mode field converters 330 will each receive optical signals output by a corresponding one of the optical fibers 350-1, 351-1, 352-1, 350-2, 351-2, 352-2. A housing (not shown) such as a two piece housing may be used to hold the optical fibers 350-1, 351-1, 352-1, 350-2, 351-2, 352-2 and the optical mode field converters 330 in place.

In some embodiments, an additional pair of holes or grooves 325 may be provided in the substrates 322, with one hole/groove 325 provided on each side of the array of optical fibers 350-1, 351-1, 352-1; 350-2, 351-2, 352-2. Alignment pins 327 may be positioned in the holes/grooves 325 on one of the substrates 322. The alignment pins 327 may be received in the corresponding holes/grooves 325 of the other connector 325, which can assist in aligning the two connectors when the connectors are mated. For example, the connectors 320-1, 320-2 of FIG. 18 could be modified to include a total of twelve optical fibers, such that each of the connectors may be MPO connectors. The fiber optic connectors 320-1, 320-2 may operate in the same manner as the connectors 120 discussed above with the exception that fiber optic connectors 320 include multiple optical fibers. Accordingly, further description of the fiber optic connectors 320 and the operation thereof will be omitted.

Figure 19A:
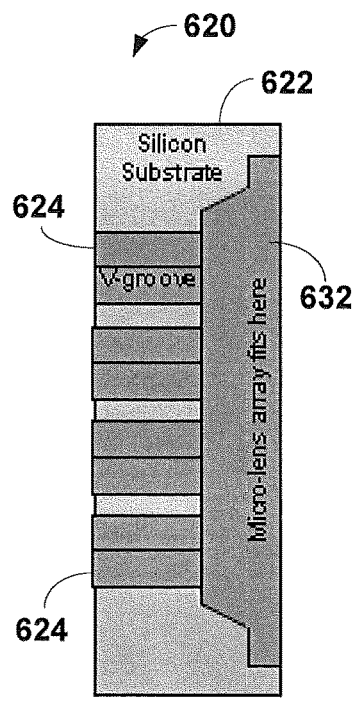
FIGS. 19A-19D illustrate another multi-fiber fiber optic connector according to embodiments of the present invention.
Figure 19B:
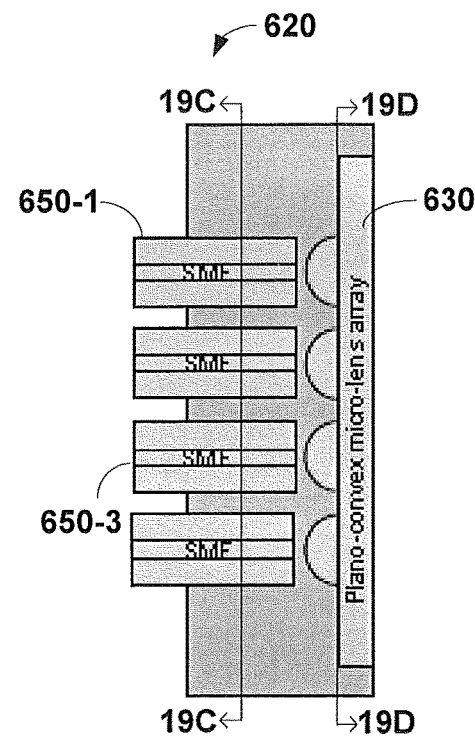
Figure 19C:
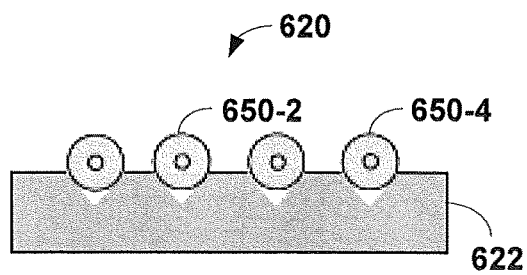
Figure 19D:
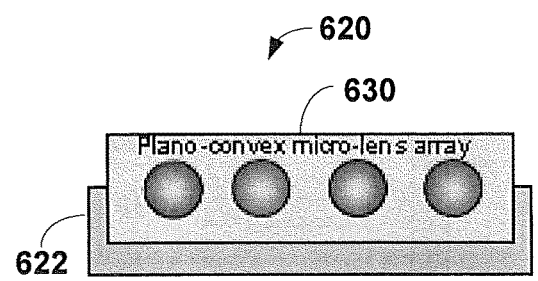

FIGS. 19A-19D illustrate another multi-fiber fiber optic connector 620 according to embodiments of the present invention. As shown in FIG. 19A, the connector 620 may comprise a substrate such as, for example, a silicon substrate 622 that is mounted within a housing (not shown). A plurality of grooves 624 (four grooves in the depicted embodiment) are provided in the substrate 622. The grooves 624 are deep V-shaped grooves. A cavity 632 is provided that is in optical communication with the grooves 624. The cavity 632 may be shaped to receive a plano-convex micro lines array 630 that includes four micro-lenses. Optical fibers 650-1 through 650-4 may be positioned in the respective grooves 624.

It will be appreciated that forming a substrate that receives multiple optic fibers (e.g., 12) can be performed at little additional cost since all twelve of the grooves, reflectors and the like can be formed simultaneously using photolithography mask and etching. Thus, scaling up the process may be relatively easy and inexpensive. Thus, the connectors according to embodiments of the present invention may be particularly useful for providing multi-fiber connectors such as, for example MPO fiber optic connectors.

Figure 20:
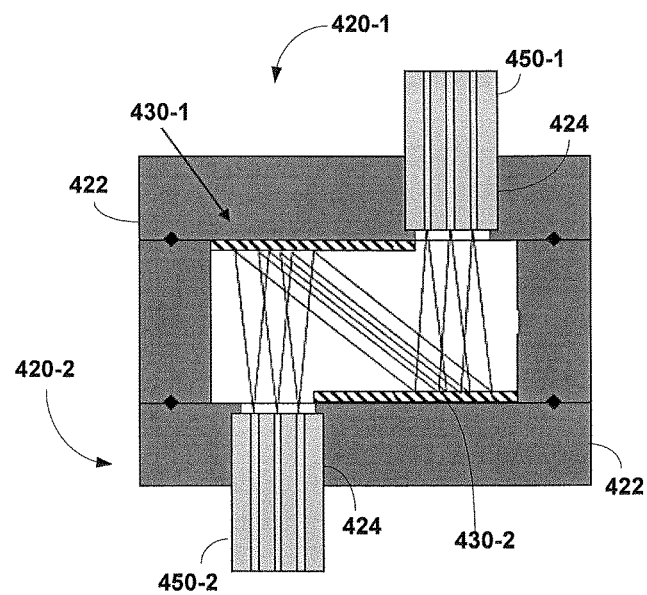
FIG. 20 is a schematic plan view of a fiber optic connector according to embodiments of the present invention that may be used to connect two multi-core optical fibers.
Figure 21:
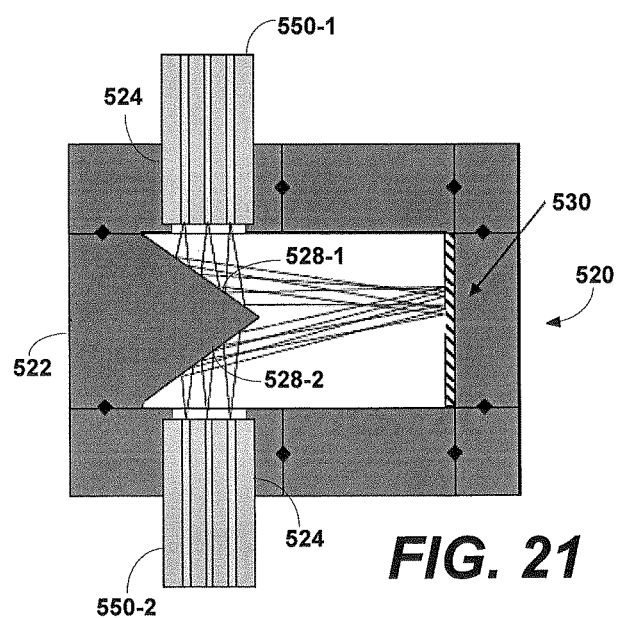
FIG. 21 is a schematic plan view of a fiber optic connector according to further embodiments of the present invention that may be used to connect two multi-core optical fibers.

Pursuant to further embodiments of the present invention, fiber optic connectors are provided that may be used to connect two multi-core optical fibers. In particular, FIG. 20 is a schematic plan view of a pair of mated fiber optic connectors 420-1, 420-2 according to embodiments of the present invention that may be used to connect two multi-core optical fibers. FIG. 21 is a schematic plan view of another pair of mated fiber optic connectors 520-1, 520-2 according to further embodiments of the present invention that may be used to connect two multi-core optical fibers.

As shown in FIG. 20, the connectors 420-1, 420-2 may be mated together. Connector 420-1 includes a substrate 422 that has a groove 424 therein. An optical fiber 450-1 is positioned in the groove 424. An HBG reflector 430-1 is positioned on a front face of the substrate 422. The HBG reflector 430-1 may be a separately fabricated component that is, for example, bonded the substrate 422 or positioned within a cavity in the substrate 422. Alternatively, the HBO reflector 430-1 may be formed on a sidewall of the substrate 422 using, for example, thin film deposition and photolithography and etching techniques or via micro-machining. The connector 420-2 may be identical to connector 420-1, so further description thereof will be omitted here.

The connector housings (not shown) may be designed so that when the connectors 420-1, 420-2 are mated together the end of optical fiber 450-2 is aligned with HBG reflector 430-1, and the end of optical fiber 450-1 is aligned with HBG reflector 430-2. Thus, as shown in FIG. 20, the light field that is output from optical fiber 450-2 impinges on HBG reflector 430-1. HBG reflector 430-1 reflects the light field to HBG reflector 430-2, which in turn reflects the light field into optical fiber 450-1. Each core of the optical fibers 450-1, 450-2 may carry different wavelength optical signals and the HBG reflectors 430-1, 430-2 may be designed so that the light output by each core of optical fiber 450-2 is transferred to the appropriate corresponding core of optical fiber 450-1.

FIG. 21 illustrates another embodiment in which two multi-core optical fibers 550-1, 550-2 are positioned within grooves 524 on a common substrate 522 that is enclosed in a housing (not shown) to form a fiber optic connector 520. The optical fibers 550-1, 550-2 may comprise, for example, optical fiber pigtails. Two reflective surfaces 528-1, 528-2 and an HBG reflector 530 are used to transfer a light field from each core of optical fiber 550-1 to a corresponding core of optical fiber 550-2.

According to still further embodiments of the present invention, the techniques according to embodiments of the present invention may be used to provide fiber optic multiplexer/de-multiplexers. Embodiments of such fiber optic multiplexer/de-multiplexers are illustrated in FIGS. 22 and 23.

Figure 22:
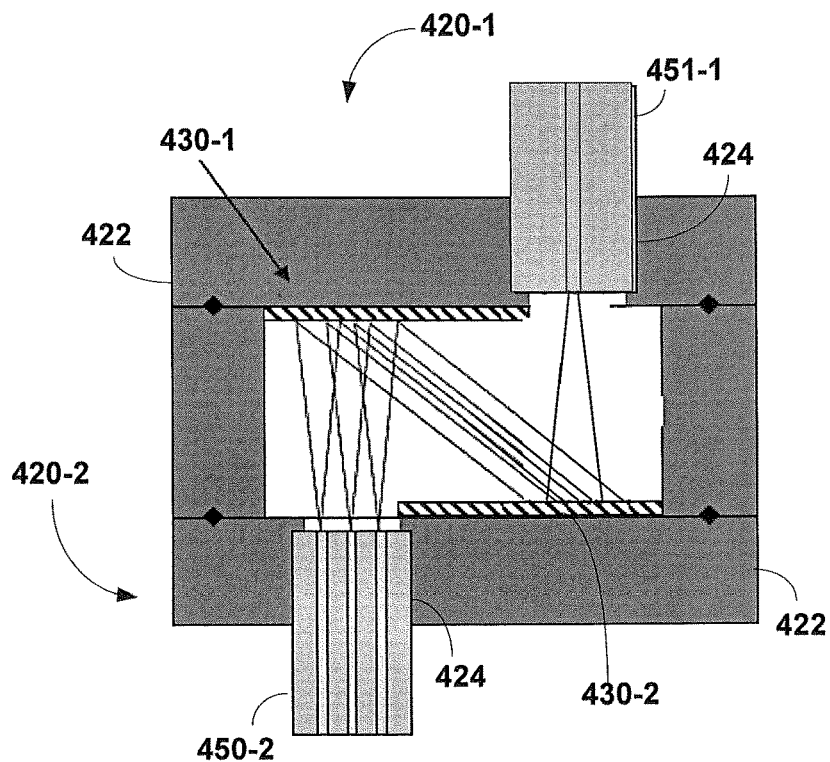
FIG. 22 is a schematic plan view of a fiber optic multiplexer/de-multiplexer according to embodiments of the present invention.
Figure 23:
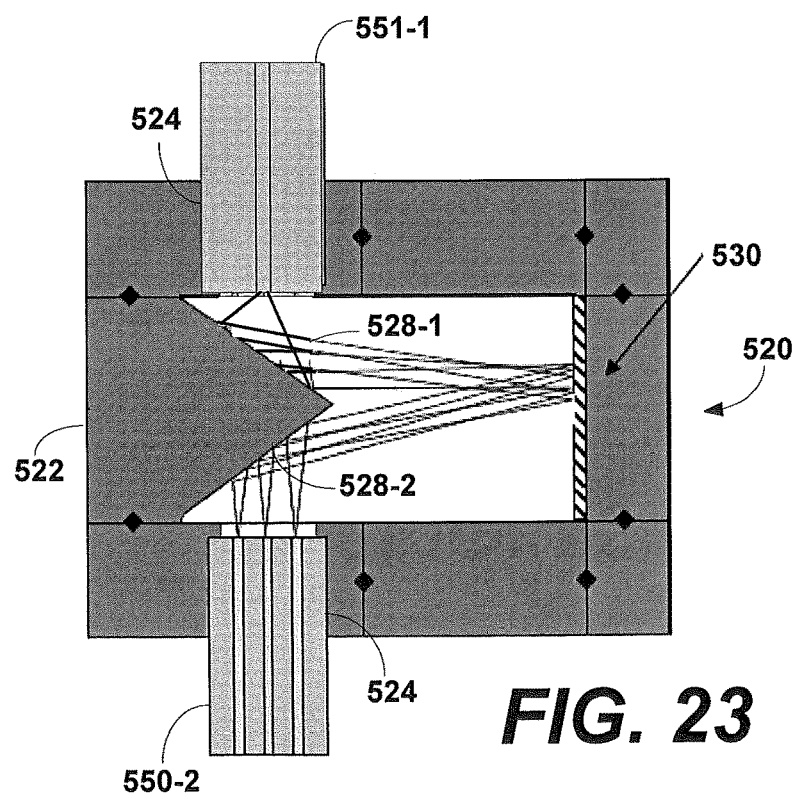
FIG. 23 is a schematic plan view of another fiber optic multiplexer/de-multiplexer according to embodiments of the present invention.

In particular, FIG. 22 is a schematic plan view of fiber optic connection that is similar to the connection shown in FIG. 20. However, in the embodiment of FIG. 22, multi-core fiber optic cable 450-1 of FIG. 20 is replaced with a single core fiber optic cable 451-1. A wave division multiplex signal may be transmitted over the single core fiber optic cable 451-1. The HBG reflectors 431-1, 431-2 will focus different wavelength optical signals of the wave division multiplexed optical signal at different points. The HBG reflectors 431-1, 431-2 may be designed so that the different wavelengths of the wave division multiplexed optical signal are focused into the different cores of a multi-core optical fiber 450-2 (as shown in FIG. 22) or into the individual cores of separate single core optical fibers. Thus, the embodiment of FIG. 22 provides an optical multiplexer/de-multiplexer that may multiplex a wave division multiplexed optical signal onto a plurality of different optical paths. FIG. 23 illustrates a similar embodiment in which an single core optical fiber 551-1 that carries a wave division multiplexed optical signal uses an HBG reflector 531 to multiplex the different wavelength optical signals in the wave division multiplexed optical signal into the separate cores of multi-core optical fiber 550-2 (or alternatively onto a plurality of single core optical fibers.

While embodiments of the present invention have primarily been illustrated above using concave mirrors and HBG reflectors to form the photonic optical mode field converters, it will be appreciated that other photonic optical mode field converters may be used. For example, in other embodiments, digital Fresnel structures may be formed on or in the substrate. Thus, it will be appreciated that the above-described embodiments are merely exemplary in nature.

Thus, pursuant to embodiments of the present invention, methods are provided that may be used to create connectorized fiber optic cables that include photonic optical mode field converters. The fiber optic connectors that are used on these connectorized fiber optic cables may be fabricated on a substrate such as a silicon wafer, and may have no moving parts. The substrates used in the connectors may be mass-produced using semiconductor and/or MEMS processing techniques at very low cost. Assembly of the connectors may be very simple as optical fibers may simply be positioned within precisely formed grooves in the substrates and locked into place using, for example, a connector housing. The connectors according to embodiments of the present invention may eliminate the need for expensive components such as ferrules and related structures and expensive assembly steps such as polishing and epoxy bonding steps that are used in the manufacture of conventional fiber optic connectors.

Embodiments of the present invention have been described above with reference to the accompanying drawings, in which embodiments of the invention are shown. This invention may, however, be embodied in many different forms and should not be construed as limited to the embodiments set forth above. Rather, these embodiments are provided so that this disclosure will be thorough and complete, and will fully convey the scope of the invention to those skilled in the art.

It will be understood that, although the terms first, second, etc. may be used above and in the claims that follow to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

All embodiments can be combined in any way and/or combination.

Many variations and modifications can be made to the preferred embodiments without substantially departing from the principles of the present invention. All such variations and modifications are intended to be included herein within the scope of the present invention, as set forth in the following claims.

That which is claimed is:

1. A fiber optic connector, comprising:
a substrate having a groove therein;
an optical fiber that is at least partly in the groove;
a reflective optical mode field converter that is positioned to receive an optical signal that is output from the optical fiber, the optical mode field converter being at least partially within the groove in the substrate and forming part of a sidewall of the groove so as to reflect the optical signal along the groove;
a housing that surrounds the substrate and the optical fiber.

2. The fiber optic connector of claim 1, wherein at least a portion of the groove has a generally U-shaped cross-section, a generally V-shaped cross-section or a generally semi-circular cross-section.

3. The fiber optic connector of claim 1, wherein the optical mode field converter is configured to expand a first light field output by the optical fiber into a second, larger area light field, and is configured to compress a third light field received at a light field input/output port of the fiber optic connector into a fourth, smaller area light field that is input to the optical fiber.

4. The fiber optic connector of claim 1, wherein the optical mode field converter comprises a concave mirror or a Holographic Bragg Grating reflector.

5. The fiber optic connector of claim 1, wherein the groove extends beyond an end of the optical fiber, and wherein the groove includes a reflective sidewall that is configured to receive light output from the optical fiber or light reflected by the optical mode field converter.

6. The fiber optic connector of claim 1, wherein the optical fiber comprises an optical fiber pigtail.

7. The fiber optic connector of claim 1, wherein the substrate has a front edge, a rear edge and a pair of side edges, and wherein a first end of the groove is at the rear edge of the substrate and a second end of the groove is at one of the side edges of the substrate.

8. The fiber optic connector of claim 7, wherein the substrate has a front edge, a rear edge and a pair of side edges, and wherein a first end of the groove is at the rear edge of the substrate and a second end of the groove is also at the rear edge of the substrate.

9. The fiber optic connector of claim 1, wherein the groove includes at least one curved or angled section.

10. The fiber optic connector of claim 1, wherein a portion of the optical fiber that is within the groove defines a first longitudinal axis, and wherein a light input/output port of the fiber optic connector is offset from the first longitudinal axis.

11. The fiber optic connector of claim 1, wherein light propagating from the optical fiber to an output port of the fiber optic connector propagates on a path having a single reflection between the optical fiber and the output port, the single reflection occurring at the optical mode field converter.

12. The fiber optic connector of claim 1, wherein the optical signal is reflected by the optical mode field converter in a reflection plane parallel to the substrate.

13. A fiber optic connection, comprising:
a first fiber optic connector that has a first housing, a first optical fiber that extends from a rear surface of the first housing, and a first light input/output port within a side surface of the first housing, the first optical fiber being positioned within a first groove in a first substrate mounted in the first housing, a first reflective optical mode field converter being positioned at least partially in the first groove and being formed as part of a sidewall of the first groove so as to reflect an optical signal, received from the first optical fiber, along the groove;
a second fiber optic connector that has a second housing, a second optical fiber that extends from a rear surface of the second housing, and a second light input/output port within a side surface of the second housing;
wherein the first and second fiber optic connectors are mounted in a side-by-side fashion and the first and second light input/output ports are in optical communication with each other.

14. The fiber optic connection of claim 13, wherein the first optical fiber and the second optical fiber are positioned side-by-side.

15. The fiber optic connection of claim 13, wherein the second optical fiber is positioned within a second groove in a second substrate that is mounted in the second housing.

16. The fiber optic connection of claim 15, wherein the first optical mode field converter is positioned to reflect the optical signal to a second optical mode field converter positioned in the second housing, the second optical mode field converter being positioned to direct the optical signal into the second optical fiber.

17. The fiber optic connection of claim 16, wherein the first and second optical fibers comprise few-mode optical fibers for the optical signal, and wherein the optical signal passes as a multi-mode optical signal between the first and second optical mode field converters.

18. The fiber optic connection of claim 17, wherein the second optical mode field converter is within the second groove.

19. The fiber optic connection of claim 16, wherein the first substrate includes silicon.

20. The fiber optic connection of claim 14, wherein the first housing has a front surface opposite from the rear surface, and the rear surface of the second housing is proximate the front surface of the first housing.

21. The fiber optic connector of claim 14, wherein the first optical mode field converter comprises one of a concave mirror or a holographic Bragg grating reflector.

22. The fiber optic connector of claim 14, wherein the optical signal is reflected by the first optical field mode converter in a reflection plane parallel to the first substrate.

* * * * *

UNITED STATES PATENT AND TRADEMARK OFFICE
CERTIFICATE OF CORRECTION

PATENT NO. : 11,133,870 B2
APPLICATION NO. : 14/324269
DATED : September 28, 2021
INVENTOR(S) : Abhijit Sengupta Page 1 of 1

It is certified that error appears in the above-identified patent and that said Letters Patent is hereby corrected as shown below:

In the Claims

Column 25, Line 60, Claim 8: "claim 7," should read --claim 1,--

Column 26, Line 50, Claim 18: "claim 17," should read --claim 16,--

Column 26, Line 53, Claim 19: "claim 16," should read --claim 15,--

Column 26, Line 55, Claim 20: "claim 14," should read --claim 13,--

Column 26, Line 59, Claim 21: "claim 14," should read --claim 13,--

Column 26, Line 62, Claim 22: "claim 14," should read --claim 13,--

Signed and Sealed this
First Day of March, 2022

Drew Hirshfeld
*Performing the Functions and Duties of the
Under Secretary of Commerce for Intellectual Property and
Director of the United States Patent and Trademark Office*